US011420573B2

(12) United States Patent
Yamamoto

(10) Patent No.: US 11,420,573 B2
(45) Date of Patent: Aug. 23, 2022

(54) WIRE HARNESS ROUTING APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Satoshi Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 114 days.

(21) Appl. No.: 17/050,960

(22) PCT Filed: May 8, 2019

(86) PCT No.: PCT/JP2019/018350
§ 371 (c)(1),
(2) Date: Oct. 27, 2020

(87) PCT Pub. No.: WO2019/220963
PCT Pub. Date: Nov. 21, 2019

(65) Prior Publication Data
US 2021/0229608 A1    Jul. 29, 2021

(30) Foreign Application Priority Data
May 16, 2018    (JP) .............................. JP2018-094431

(51) Int. Cl.
*B60R 16/02*    (2006.01)
*H01B 7/00*    (2006.01)

(52) U.S. Cl.
CPC ....... *B60R 16/0215* (2013.01); *H01B 7/0045* (2013.01)

(58) Field of Classification Search
CPC .......................... B60R 16/0215; H01B 7/0045
(Continued)

(56) References Cited

U.S. PATENT DOCUMENTS

| 4,542,858 | A | * | 9/1985 | Manges | ............. | B65H 75/4449 |
| | | | | | | 242/378 |
| 7,207,833 | B2 | * | 4/2007 | Jeong | ................... | B60R 16/027 |
| | | | | | | 297/341 |

(Continued)

FOREIGN PATENT DOCUMENTS

| JP | 6052148 | 12/2016 |
| JP | 2017-189040 | 10/2017 |

OTHER PUBLICATIONS

Official Communication issued in International Bureau of WIPO Patent Application No. PCT/JP2019/018350, dated Jun. 18, 2019, along with an English translation thereof.

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness routing apparatus includes: a wire harness arranged between a base portion provided in a vehicle and a seat that is provided so as to be able to rotate with respect to the base portion; a case that can rotate together with the seat while accommodating the wire harness; and a base-side fixing portion that fixes, to the base portion, an end portion of the wire harness pulled out toward the base portion from the case, and that can rotate relative to the case accompanying rotation of the seat. The case includes a first accommodation portion that is arranged inside of a range of a rotational path on which the base-side fixing portion rotates (Continued)

relative to the case, and a second accommodation portion that is provided bulging from a portion that is different from the range of the rotational path on which the base-side fixing portion rotates.

9 Claims, 20 Drawing Sheets

(58) Field of Classification Search
USPC .................................................. 174/72 A
See application file for complete search history.

(56) References Cited

U.S. PATENT DOCUMENTS

2013/0270399 A1* 10/2013 Berkowitz ........... B25J 19/0029
                                                              248/65
2017/0294767 A1    10/2017 Sano et al.

* cited by examiner

WIRE HARNESS ROUTING APPARATUS

TECHNICAL FIELD

The technique disclosed by the present specification relates to a wire harness routing apparatus.

BACKGROUND ART

For example, a wire harness routing apparatus disclosed in Japanese Patent No. 6052148 (hereinafter referred to as "Patent Document 1") has been known as a wire harness routing apparatus for supplying power to a rotatable seat mounted in a vehicle such as an automobile. This wire harness routing apparatus is configured to fix, to a bottom surface of a seat, a rotation absorption case having a circular arc-shaped slide groove in which a slider can move in a circular arc shape. If the seat is rotated, the wire harness follows the rotation of the seat due to the rotation absorption case rotating in accordance with the rotation of the seat and the slider sliding in the circular arc-shaped slide groove, and the excess length of the wire harness is accommodated by causing the excess length of the wire harness to make a detour in the rotation absorption case.

CITATION LIST

Patent Documents

Patent Document 1: Japanese Patent No. 6052148

SUMMARY OF INVENTION

Problem to be Solved

Incidentally, according to the above-described wire harness routing apparatus, for example, if the rotation angle of the seat is increased to, for example, 180 degrees or more, or the like, the excess length of the wire harness increases, and therefore the excess length of the wire harness cannot be accommodated in the rotation absorption case. Even so, if the size of the rotation absorption case is increased, there is concern that the rotation absorption case will interfere with another member or the like when the seat is rotated.

The present specification discloses a technique for absorbing excess length of a wire harness without hindering rotation of a seat.

Solution to the Problem

The technique disclosed by the present specification is configured to include: a wire harness arranged between a base portion provided in a vehicle and a seat that is provided so as to be able to rotate with respect to the base portion; a case that can rotate together with the seat in a state of accommodating the wire harness; and a base-side fixing portion that fixes, to the base portion, an end portion of the wire harness pulled out toward the base portion from the case, and can rotate relative to the case accompanying rotation of the seat. The case includes a first accommodation portion that is provided about a rotational axis of the seat and is arranged on an inner side of a range of a path on which the base-side fixing portion rotates relative to the case. A second accommodation portion that is provided bulging outward from a portion that is different from the range of the path on which the base-side fixing portion rotates in the first accommodation portion.

According to the wire harness routing apparatus with this configuration, it is possible to accommodate the excess length of the wire harness in the first accommodation portion, and it is possible to accommodate the wire harness also in the second accommodation portion provided bulging from the first accommodation portion. Accordingly, even if the rotation angle of the seat is large (e.g., 180 degrees or more), the excess length of the wire harness can be absorbed.

Also, since the first accommodation portion is provided on the inner side of the range of the path on which the base-side fixing portion rotates and the second accommodation portion is provided bulging outward from a portion different from the range of the path on which the base-side fixing portion rotates, it is possible to absorb the excess length of the wire harness using the first accommodation portion and the second accommodation portion without hindering the rotation of the seat.

The wire harness routing apparatus disclosed by the present specification may also have the following configuration.

A configuration is also possible in which the first accommodation portion includes a circular portion that is formed into an approximately circular shape such that a portion of an outer shape of the first accommodation portion conforms to a rotational path of the base-side fixing portion.

According to this configuration, it is possible to provide the first accommodation portion by arranging the circular portion on the entire inner side of the rotational path of the base-side fixing portion, and therefore, for example, compared to the case of providing the accommodation portion in a rectangular shape or a small circular shape in the rotation center, the wire harness can be moved in a state of being loosely bent when the wire harness is moved in the first accommodation portion. Accordingly, the movement of the wire harness in the first accommodation portion is smoother, and it is possible to suppress hindrance of the rotation of the seat due to the movement of the wire harness.

A configuration is also possible in which the second accommodation portion is formed continuously with an end portion of the circular portion so as to conform to a tangent line of the circular portion.

For example, when the second accommodation portion is provided protruding in the radial direction with respect to the circular portion, it is necessary to significantly bend the wire harness that is routed spanning between the circular portion and the second accommodation portion, and therefore the entirety of the case increases in size, depending on the minimum radius of curvature of the wire harness.

However, according to the above-described configuration, it is possible to smoothly route the wire harness spanning between the circular portion of the first accommodation portion and the second accommodation portion without significantly bending the wire harness. Accordingly, it is possible to suppress an increase in the size of the case while absorbing the excess length of the wire harness.

A configuration is also possible in which the second accommodation portion includes, in a bulging end portion, a curved portion along which the wire harness is arranged in a bent state, and the radius of curvature of the curved portion is set to be greater than an allowable radius of curvature of the wire harness.

According to this configuration, the wire harness can be accommodated by loosely bending the wire harness in the second accommodation portion. Accordingly, the wire harness can be moved smoothly in the second accommodation portion, and it is possible to suppress a case in which the rotation of the seat is hindered due to the wire harness moving in the case.

A configuration is also possible in which a seat-side fixing portion for fixing an end portion on the seat side of the wire harness toward the rotational center of the case, and a harness accommodation portion arranged outward in a radial direction with respect to the seat-side fixing portion are provided in the circular portion, the wire harness is accommodated in the harness accommodation portion when the case is rotated in one direction, and the wire harness is accommodated in the second accommodation portion when the case is rotated in another direction, which is a direction opposite to the one direction, and the second accommodation portion is provided at a position on a side opposite to that of the harness accommodation portion, using the seat-side fixing portion as a reference.

For example, if the case is rotated in a mode in which the second accommodation portion is provided at a position on the same side as the harness accommodation portion using the seat-side fixing portion as a reference, there is concern that the wire harness will be bent excessively. On the other hand, if an attempt is made to accommodate the wire harness in the case by loosely wrapping up the wire harness, the case will increase in size. However, according to this configuration, the wire harness can be arranged spanning between the first harness accommodation portion of the circular portion and the second accommodation portion, using the seat-side fixing portion as a reference. Accordingly, the excess length of the wire harness can be accommodated in the first accommodation portion and the second accommodation portion without excessively bending the wire harness.

A configuration is also possible in which the harness accommodation portion includes a first inner circumferential surface that is located on an outer side in a radial direction and is provided in a circular arc shape, and a second inner circumferential surface that is formed curved on the seat-side fixing portion side so as to oppose the first inner circumferential surface, and the harness accommodation portion is formed such that a distance between a central portion of the second inner circumferential surface and the first inner circumferential surface is the greatest.

For example, if the wire harness accommodated in the first accommodation portion is long, the second accommodation portion that accommodates the wire harness when the case is rotated in the other direction needs to be increased in size. However, with the above-described configuration, when the case is rotated in the one direction, the wire harness can be accommodated along the second inner circumferential surface of the seat-side fixing portion, and therefore, for example, compared to the case where the wire harness is arranged along the first inner circumferential surface side, the length of the wire harness that is accommodated in the first accommodation portion can be shortened. That is, it is possible to suppress an increase in the size of the second accommodation portion that accommodates the excess length of the wire harness that occurs when the case is rotated in the other direction.

A configuration is also possible in which the second inner circumferential surface is formed such that its radius of curvature increases the more spaced apart the second inner circumferential surface is from the position at which the wire harness is fixed in the seat-side fixing portion.

According to this configuration, the radius of curvature reaches its maximum at the portion that is the most spaced apart from the position at which the wire harness is fixed, and therefore, if the case is rotated in the other direction after the case is rotated in the one direction such that the wire harness is wrapped around the seat-side fixing portion, the case can be rotated such that the second inner circumferential surface presses the wire harness. That is, the wire harness can be moved smoothly from the harness accommodation portion of the first accommodation portion to the second accommodation portion, and it is possible to suppress hindrance of the rotation of the seat caused by the wire harness moving.

It is also possible to use a configuration in which the wire harness is constituted by including the outer covering body made of resin that is configured to bend only in one direction, and a wire that is inserted into the outer covering body and is configured to move together with the outer covering body in the case.

With this configuration, it is possible to prevent the wire harness from being tangled due to the wire harness bending in a direction different from the one direction in the first accommodation portion and the second accommodation portion, and therefore it is possible to prevent the rotation of the seat from being hindered due to the wire harness bending in a direction different from the one direction.

A configuration is also possible in which the seat-side fixing portion includes an outer covering body fixing portion for fixing the outer covering body, and a wire fixing portion for fixing the wire pulled out from the outer covering body, and a wire excess length absorption portion for accommodating the wire pulled out from the outer covering body when the wire harness moves in the case is provided between the outer covering body fixing portion and the wire fixing portion in the seat-side fixing portion.

For example, in the case of a wire harness in which multiple wires are inserted through the outer covering body, when the wire harness is bent, the wires are pulled out from the end portion of the outer covering body due to the difference in the radius of curvature between the outer covering body and the wires in some cases, and thus there is concern that the rotation of the seat will be hindered due to the excessive length of the pulled-out wires.

However, according to the above-described configuration, since the wire excess length absorption portion that absorbs the excess length of the wires pulled out from the outer covering body is provided between the outer covering body fixing portion and the wire fixing portion, it is possible to suppress hindrance of the rotation of the seat due to the excess length of the wires pulled out from the end portion of the outer covering body when the wire harness was bent.

Advantageous Effects of the Invention

According to the technique disclosed by the present specification, it is possible to absorb the excess length of the wire harness without hindering the rotation of the seat.

DESCRIPTION OF EMBODIMENTS

Embodiment

An embodiment of the technique disclosed in the present specification will be described with reference to FIGS. 1 to 20.

Figure 11:
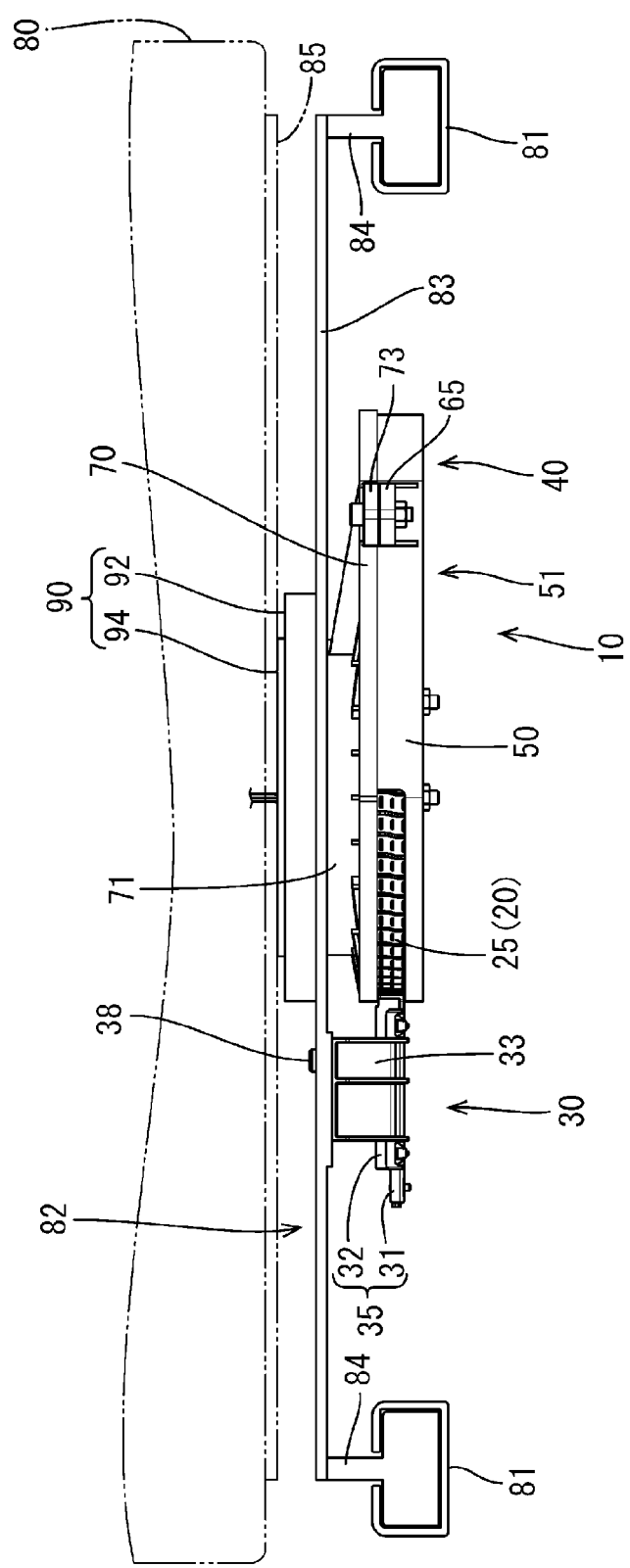
FIG. 11 is a rear view showing a state in which the wire harness routing apparatus in the first state is fixed to the seat and the base portion.

FIG. 11 illustrates an exemplary wire harness routing apparatus 10 of the present embodiment, which routes a wire harness 20 between a base portion 82 and a seat 80 that are provided in a vehicle such as an automobile. Note that in the following description, in the front-rear direction, the F side is the front side and the R side is the rear side, using the directions of the arrows in the drawings as a reference.

Figure 10:
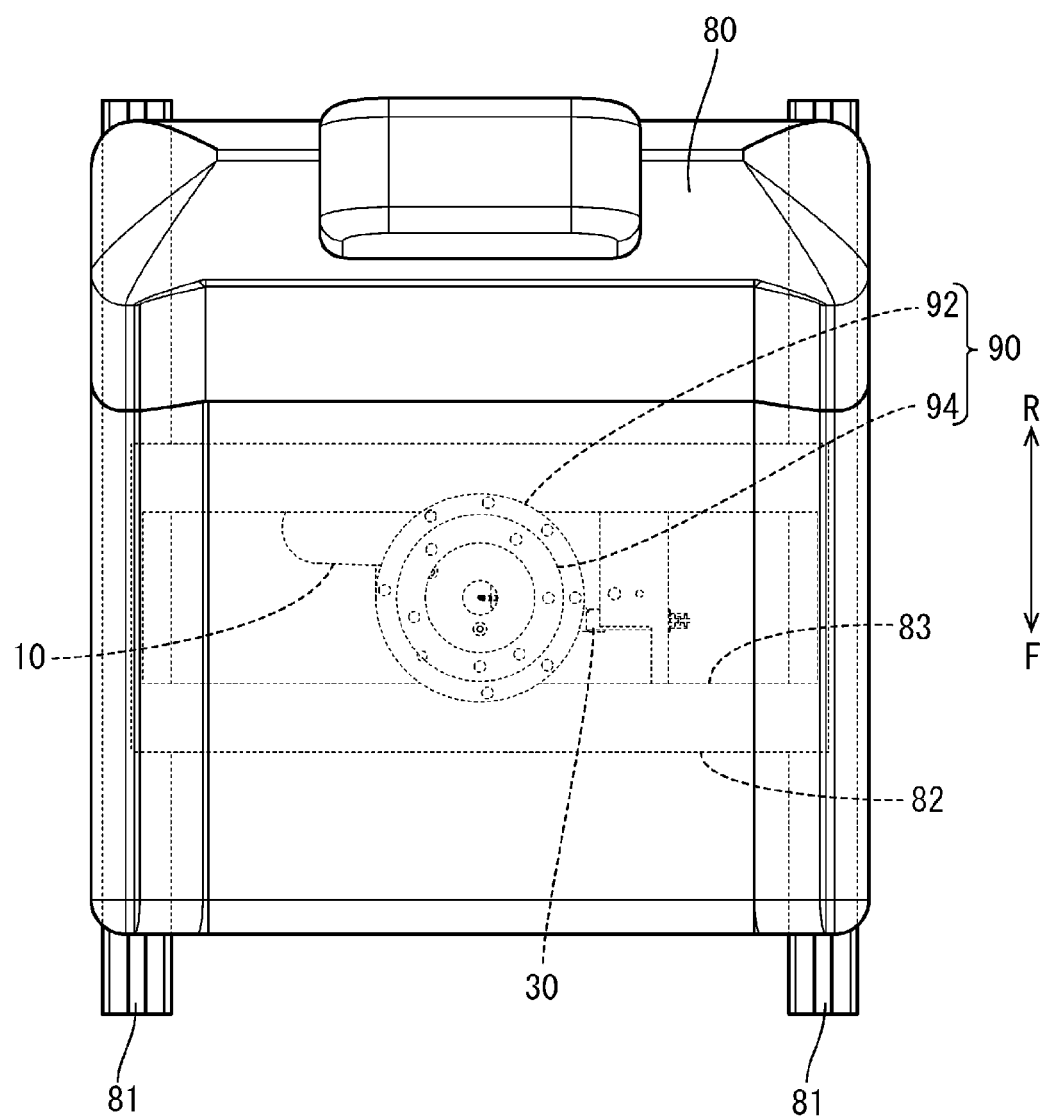
FIG. 10 is a plan view showing a state in which the seat is arranged in a first state.
Figure 14:
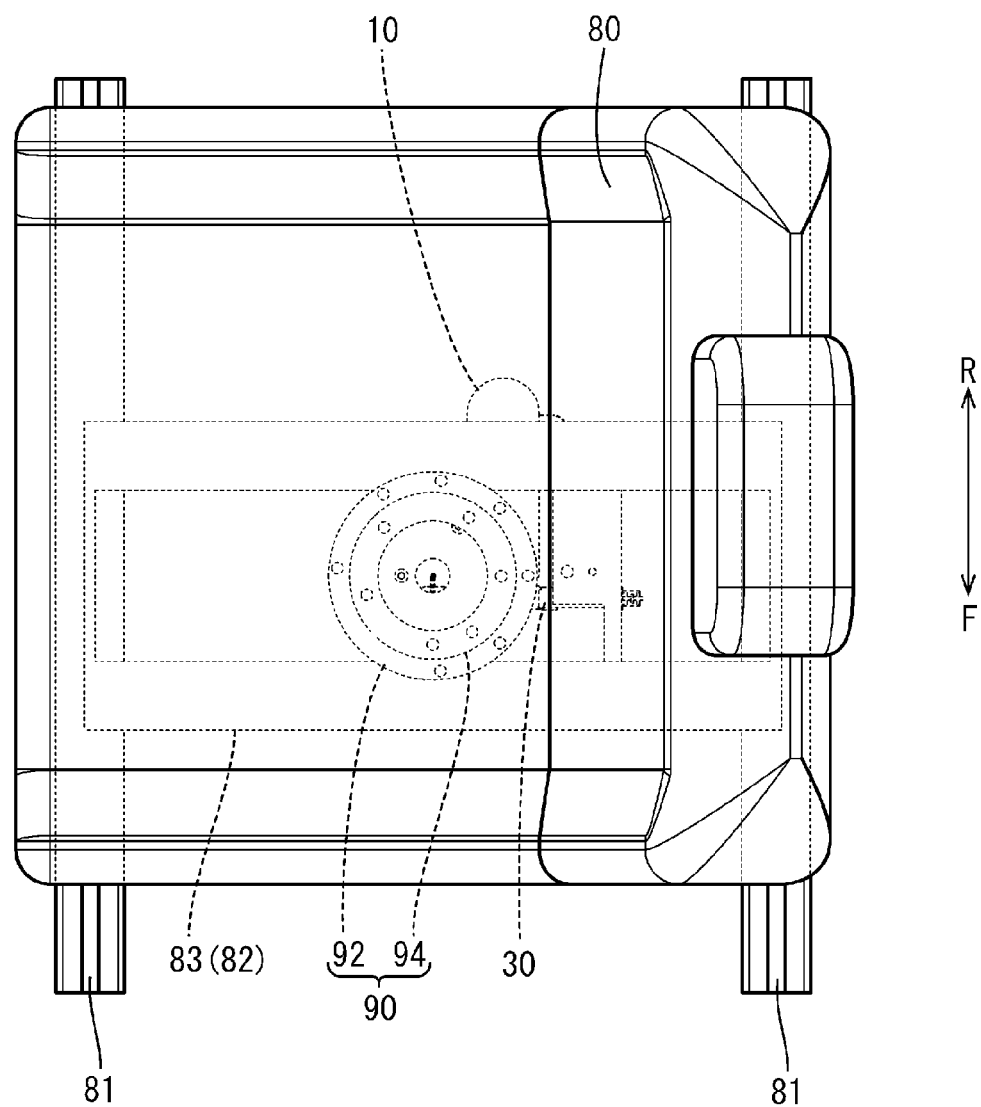
FIG. 14 is a plan view showing a state in which the seat is arranged in the second state.
Figure 15:
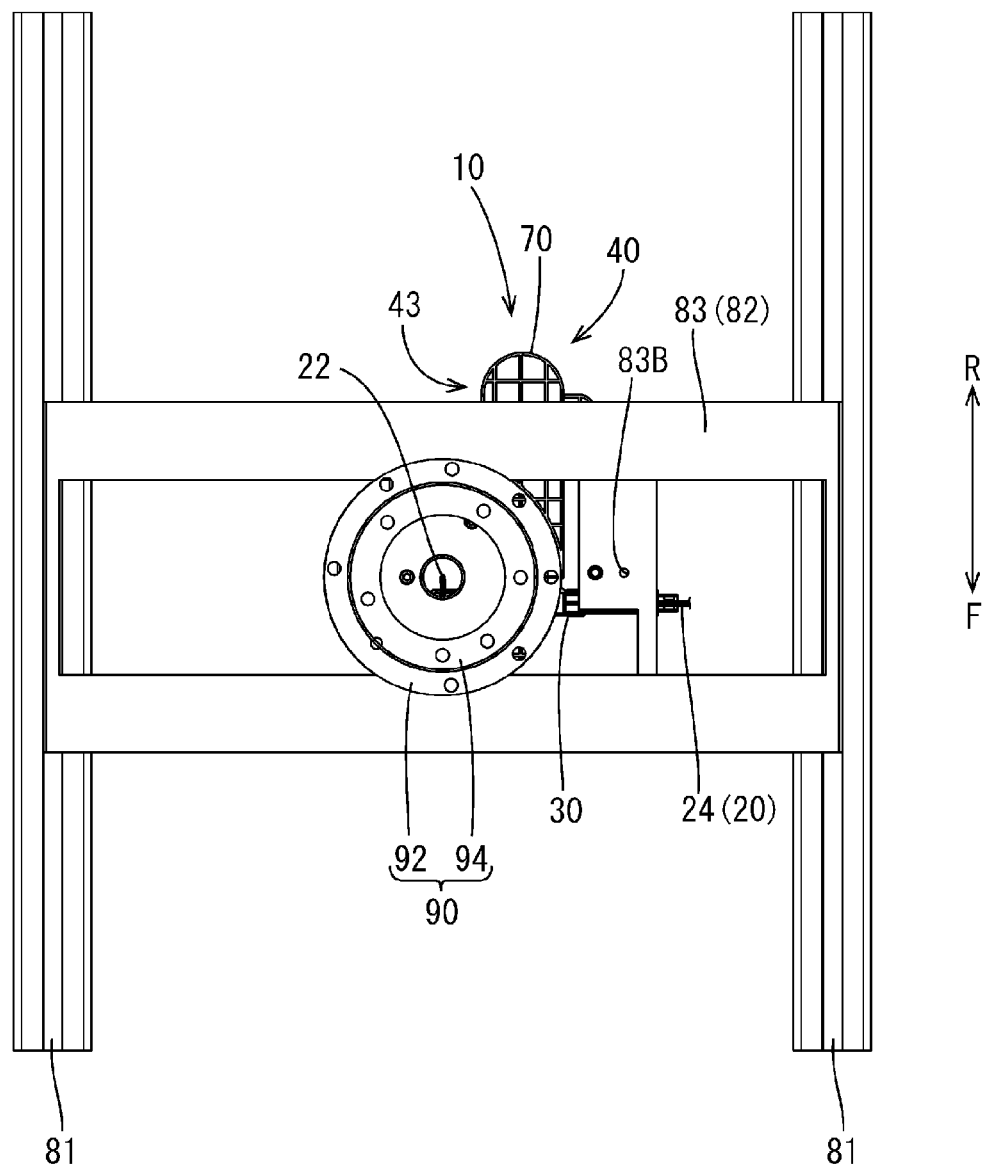
FIG. 15 is a plan view showing a state in which the wire harness routing apparatus in the second state is fixed to the base portion.
Figure 16:
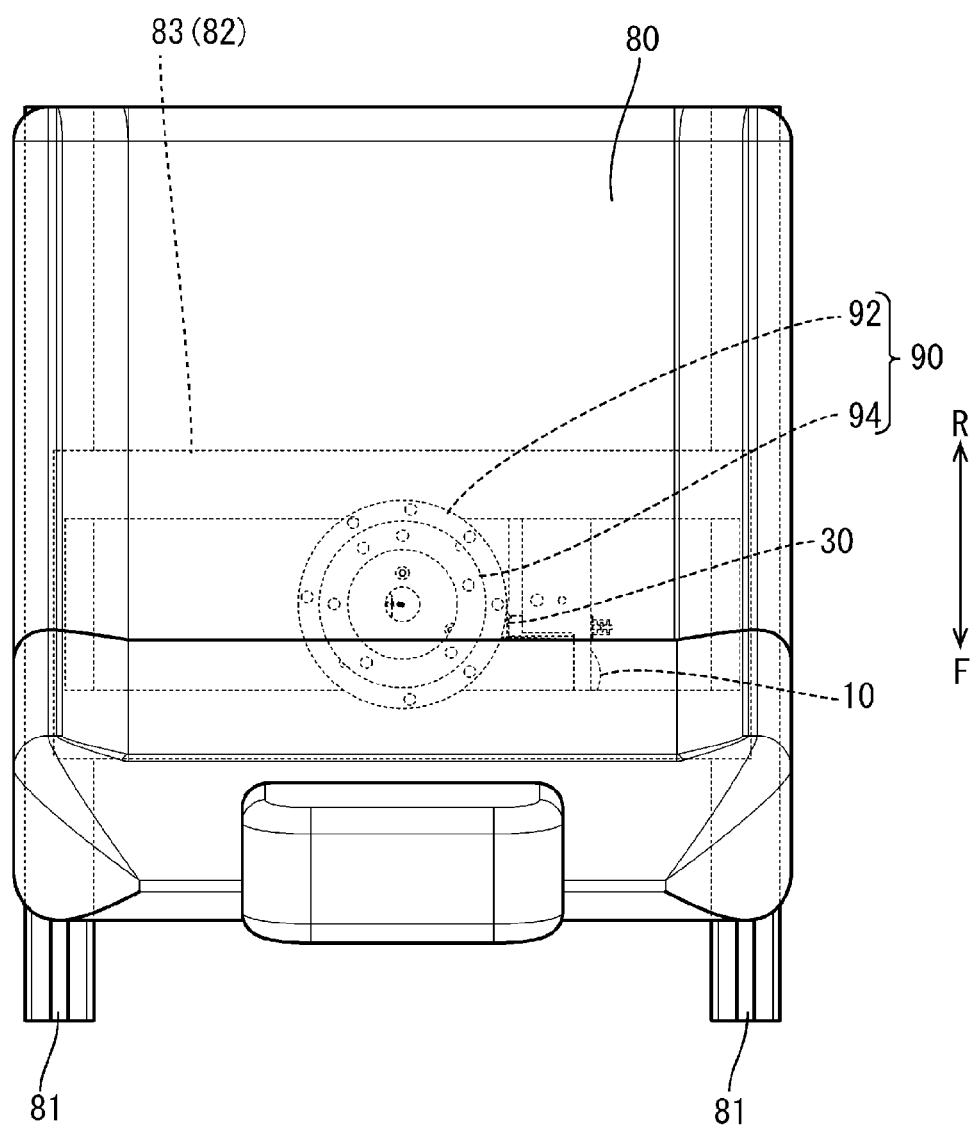
FIG. 16 is a plan view showing a state in which the seat is arranged in a third state.
Figure 17:
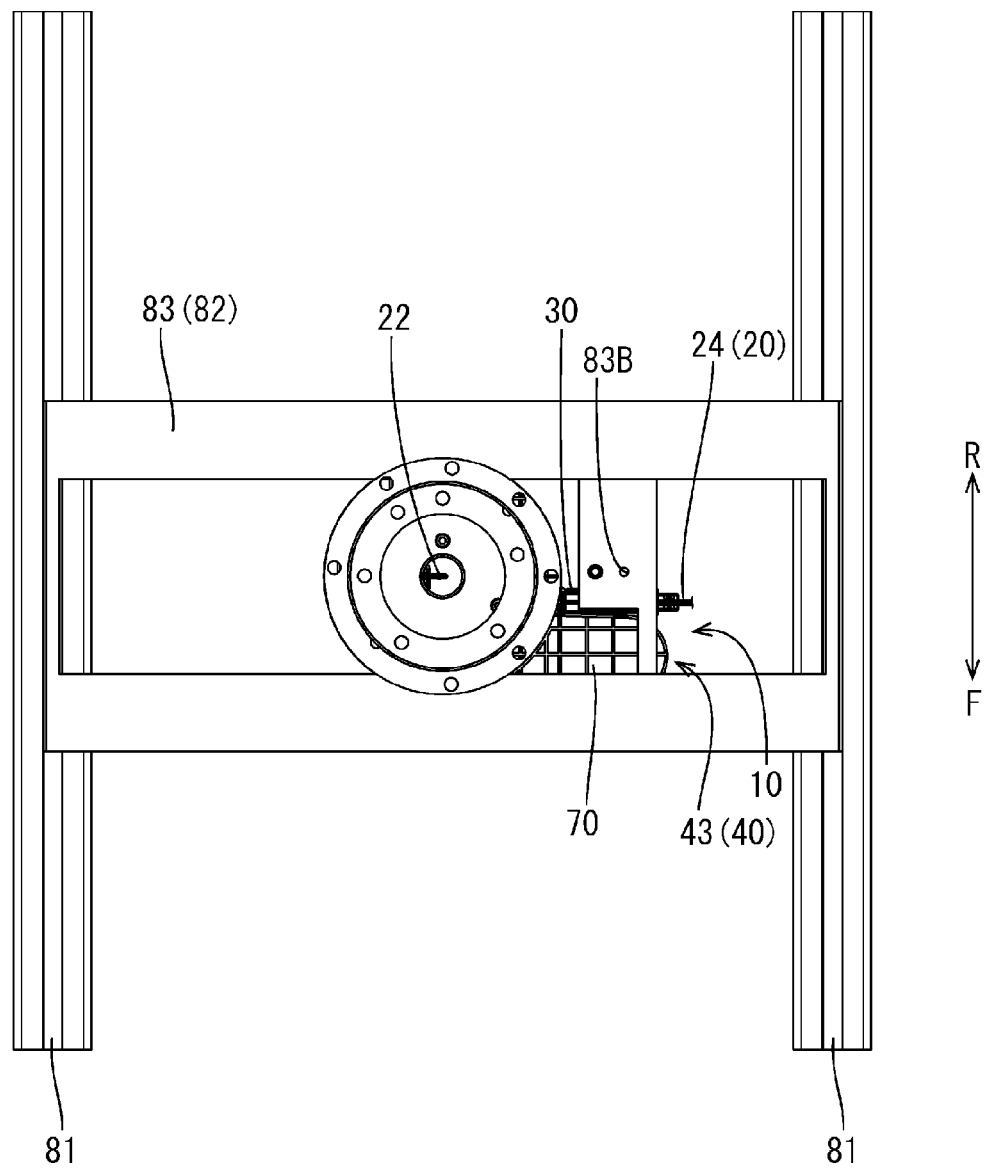
FIG. 17 is a plan view showing a state in which the wire harness routing apparatus in the third state is fixed to the base portion.

The seat 80 is, for example, a seat on the driver's seat side of the vehicle, and as shown in FIGS. 10, 14, and 16, is fixed to the base portion 82, which can slide in the front-rear direction on a pair of metal rails 81 that are fixed to a floor portion of the vehicle.

Figure 12:
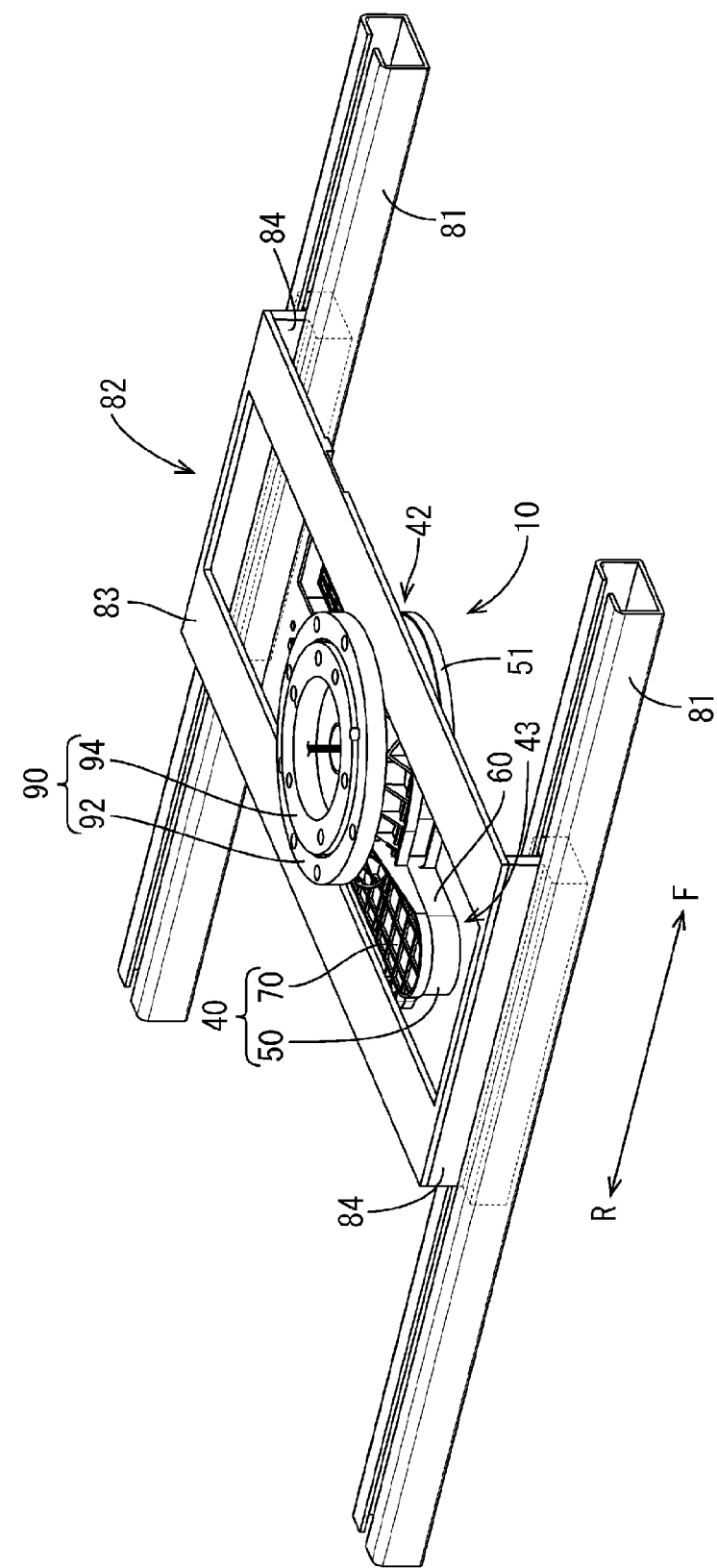
FIG. 12 is a perspective view showing a state in which the wire harness routing apparatus in the first state is fixed to the base portion.
Figure 13:
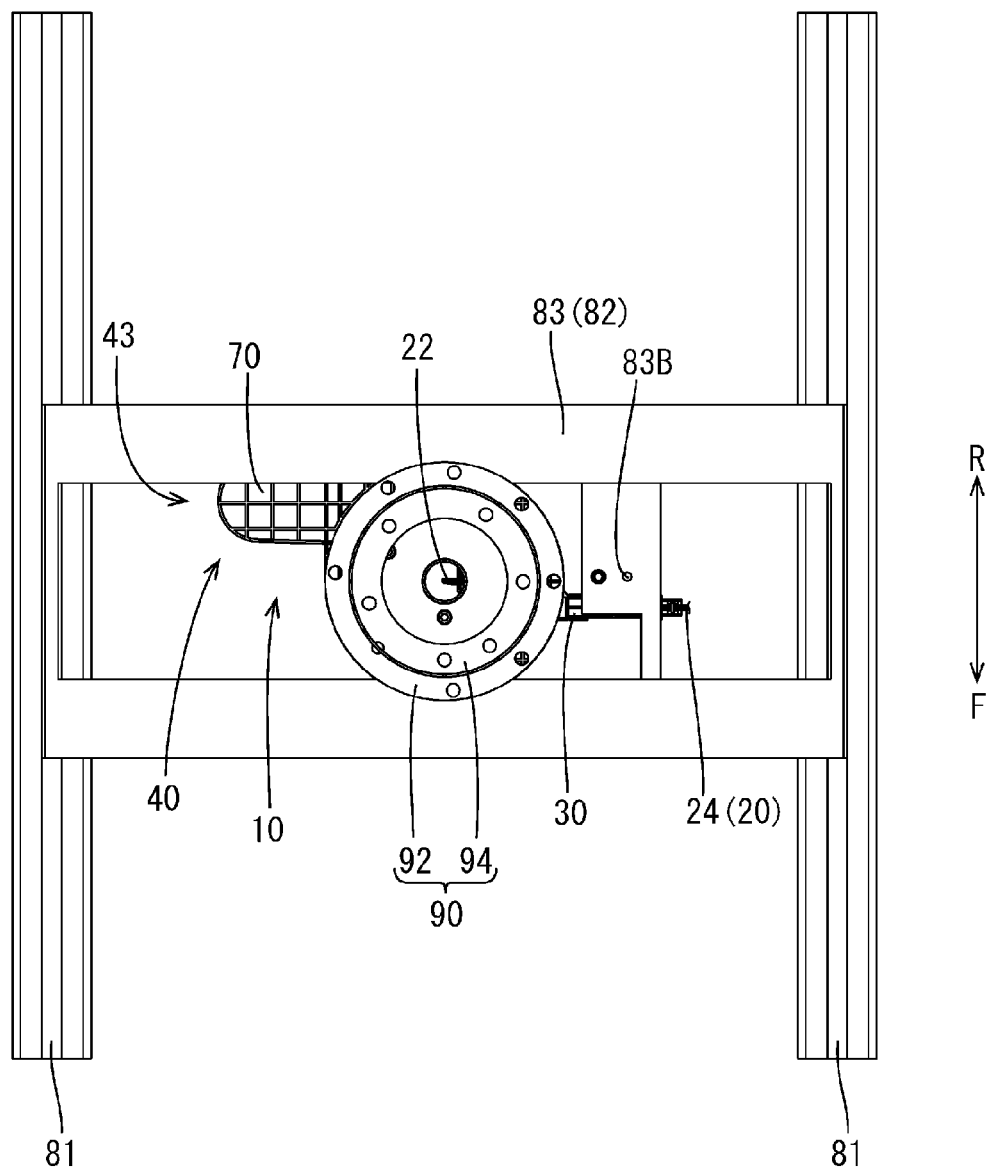
FIG. 13 is a plan view showing a state in which the wire harness routing apparatus in the first state is fixed to the base portion.

As shown in FIGS. 11 to 13, the base portion 82 includes a base main body 83 that has an approximately rectangular frame shape, and a pair of leg portions 84 that extend downward from both side edges of the base main body 83.

The pair of leg portions 84 are attached so as to be able to slide in the front-rear direction on the rails 81, and a rotation platform 90 is fixed to the upper surface of the base main body 83.

The rotation platform 90 is made of metal, and includes a base-side pedestal 92 that is fixed to the base portion 82, and a seat-side pedestal 94 that is rotatably attached to the base-side pedestal 92.

The base-side pedestal 92 has a circular flat plate shape, and is fixed through bolt fastening or the like to the base main body 83 of the base portion 82.

The seat-side pedestal 94 is formed into a circular flat shape that is one size smaller than the base-side pedestal 92, and is fixed through bolt fastening or the like to a bottom plate 85 that is attached to the bottom portion of the seat 80. Also, the seat-side pedestal 94 is attached on the inner side of the base-side pedestal 92 via a bearing or the like, and can rotate centered about the axial center of the base-side pedestal 92 with respect to the base-side pedestal 92. Accordingly, the seat 80 can rotate with respect to the base portion 82.

A stopper (not shown) is provided between the base-side pedestal 92 and the seat-side pedestal 94, and due to the stopper, the seat 80 is allowed to rotate in only an approximately 270-degree range between a second state (see FIG. 14) in which the seat 80 faces rightward by rotating approximately 90 degrees clockwise from a first state (see FIG. 10) of facing frontward, and a third state (see FIG. 16) in which the seat 80 faces rearward by rotating from the first state approximately 180 degrees counterclockwise, which is the direction opposite to that of the second state.

As shown in FIGS. 1 to 5, the wire harness routing apparatus 10 is constituted by including a wire harness 20, a case 40 that accommodates the wire harness 20, and a base-side fixing portion 30 that fixes one end of the wire harness 20 to the base portion 82.

One end portion of the wire harness 20 is a base-side end portion 21 that is routed to the base portion 82, and is connected to a device (not shown) such as an ECU (Electronic Control Unit) of the vehicle. The wire harness 20 that is routed to the base portion 82 of the present embodiment is routed above or under the floor below a mat, panel, or the like from the base portion 82, for example, but this is not shown in the drawings. On the other hand, the other end portion of the wire harness 20 is a seat-side end portion 22, and for example, is connected to any electrical component (not shown) on the seat side, such as an electric slide, an electric reclining motor, or a seat heater, which is attached to the seat 80. Also, supply of electricity and transmission and reception of signals between the vehicle-side device and the electrical components of the seat 80 are performed via the wire harness 20.

As shown in FIGS. 5 and 18 to 20, the wire harness 20 is constituted by including multiple (in the present embodiment, five) wires 24 and an external covering body 25 through which the wires 24 are inserted. Each wire 24 is obtained by covering a core wire composed of a metal with excellent electrical conductivity with an insulating covering made of a synthetic resin, and the end portion of each wire 24 is arranged on the seat 80 side and is connected to an electrical component.

Figure 5:
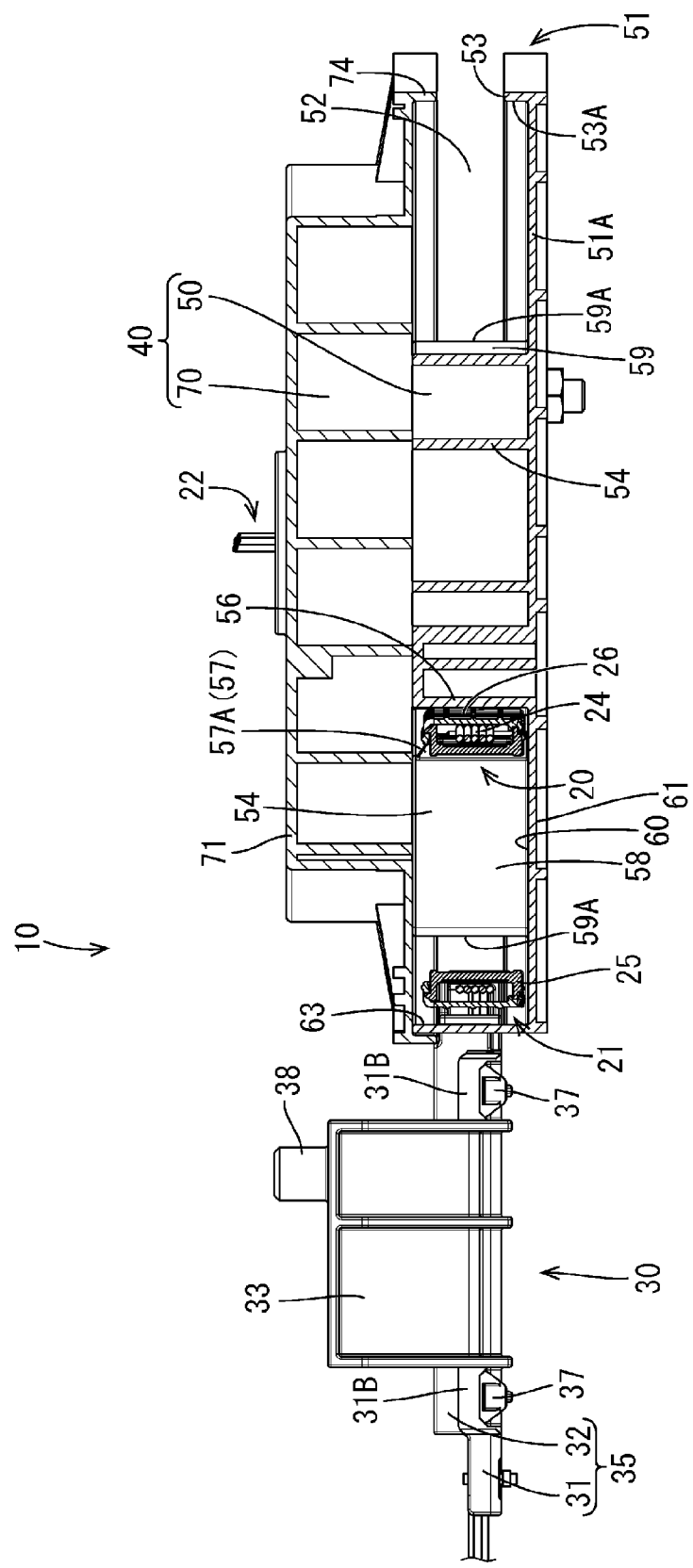
FIG. 5 is a cross-sectional view taken along line B-B of FIG. 2.
Figure 18:
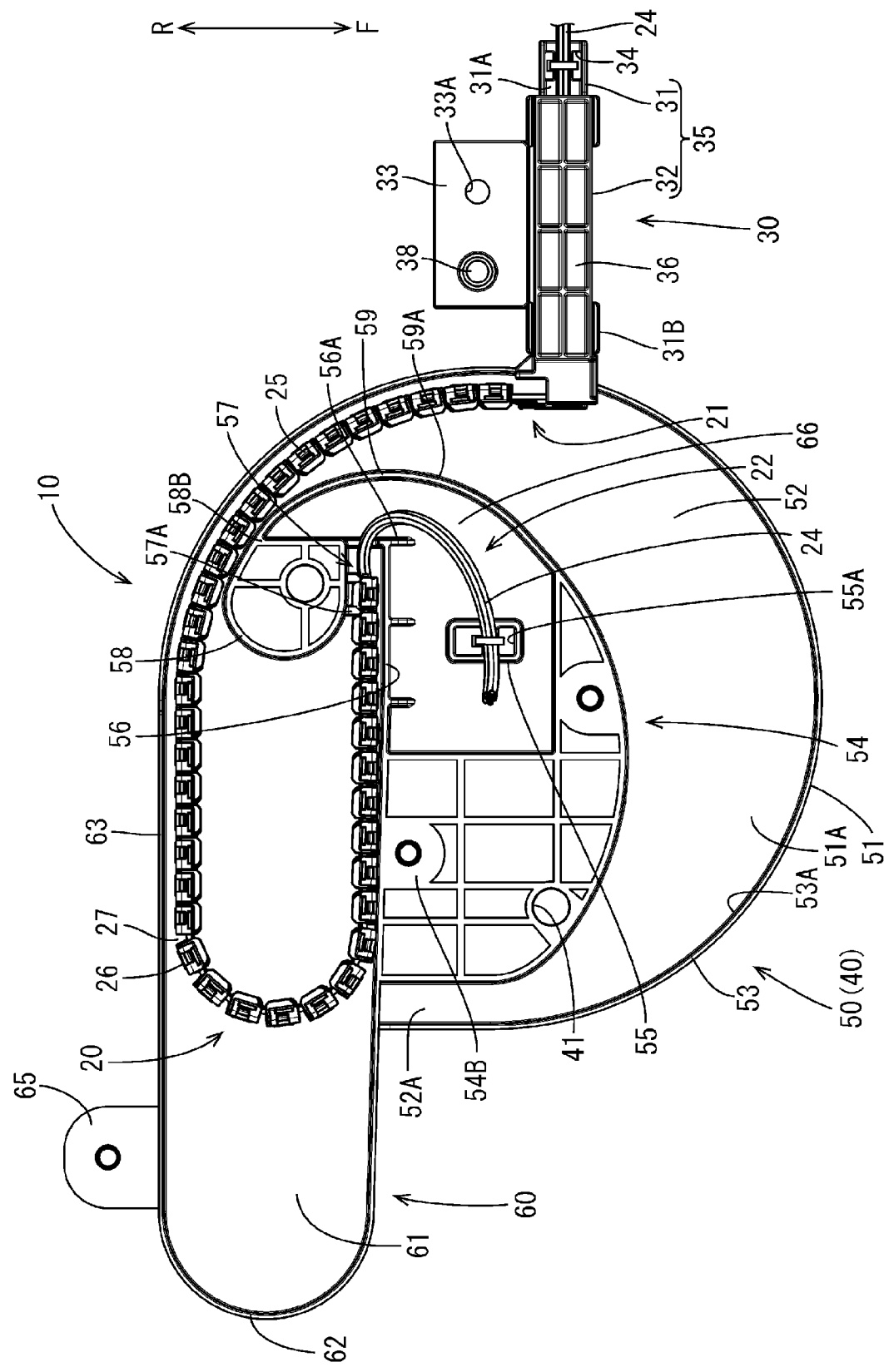
FIG. 18 is a plan view showing the wire harness routing apparatus that has been arranged in the first state with the upper case removed.
Figure 19:
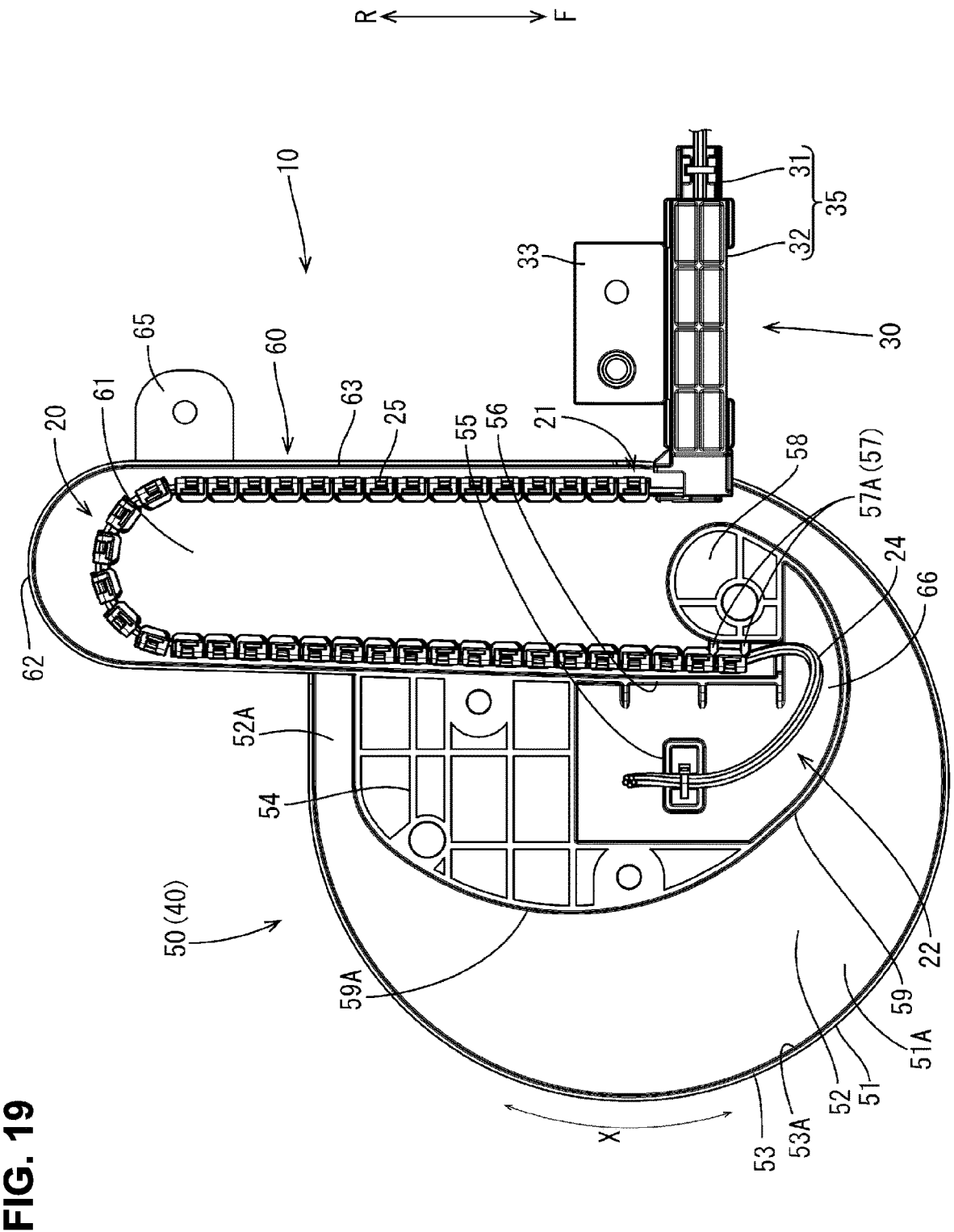
FIG. 19 is a plan view showing the wire harness routing apparatus that has been arranged in the second state with the upper case removed.
Figure 20:
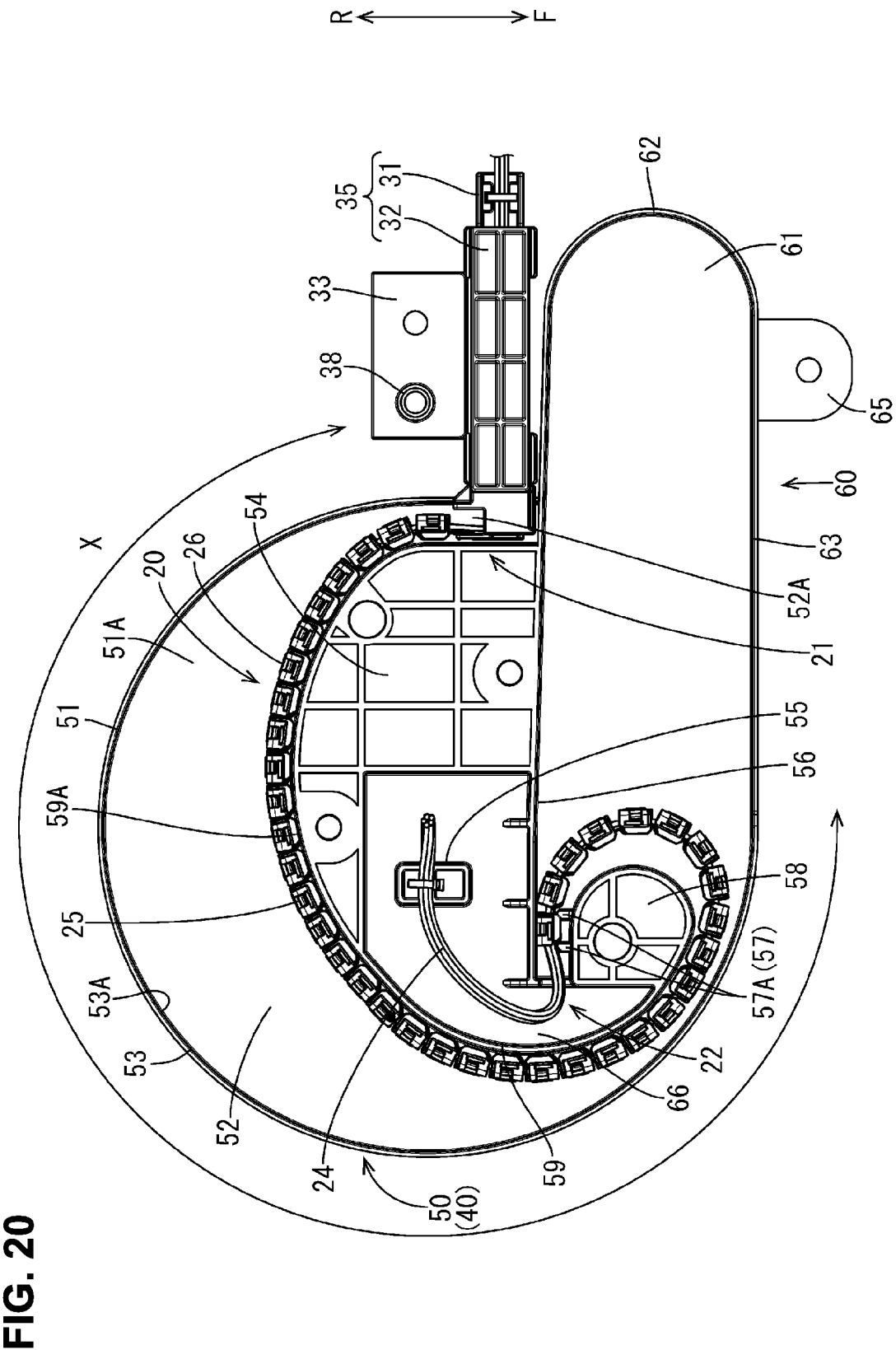
FIG. 20 is a plan view showing the wire harness routing apparatus that has been arranged in the third state with the upper case removed.

The outer covering body 25 is formed into a vertically-elongated band shape using an insulating synthetic resin, and as shown in FIG. 5, the multiple wires 24 are held in a state of being arranged side by side in the up-down direction in the outer covering body 25. The outer covering body 25 can be bent in only one direction (in the present embodiment, rightward, which is clockwise, in FIGS. 18 to 20) in a state in which the wires 24 are inserted therethrough. As shown in FIGS. 18 to 20, the present embodiment can be bent in only one direction by forming multiple slits 27 on one side surface 26 of the outer covering body 25. That is, the wire harness 20 can be put in a bent state in which the wire harness 20 is bent into a spiral shape, from a linear state of extending in a straight line.

As shown in FIGS. 11 to 13, the base-side fixing portion 30 fixes the multiple wires 24 pulled out from the outer covering body 25 to the base portion 82, and is constituted by including a mounting portion 31 on which the multiple wires 24 pulled out from the outer covering body 25 are mounted, a lid portion 32 that is attached to the mounting portion 31 so as to cover the mounting portion 31 from above, and a fixing piece 33 that fixes the mounting portion 31 to the base portion 82.

Figure 1:
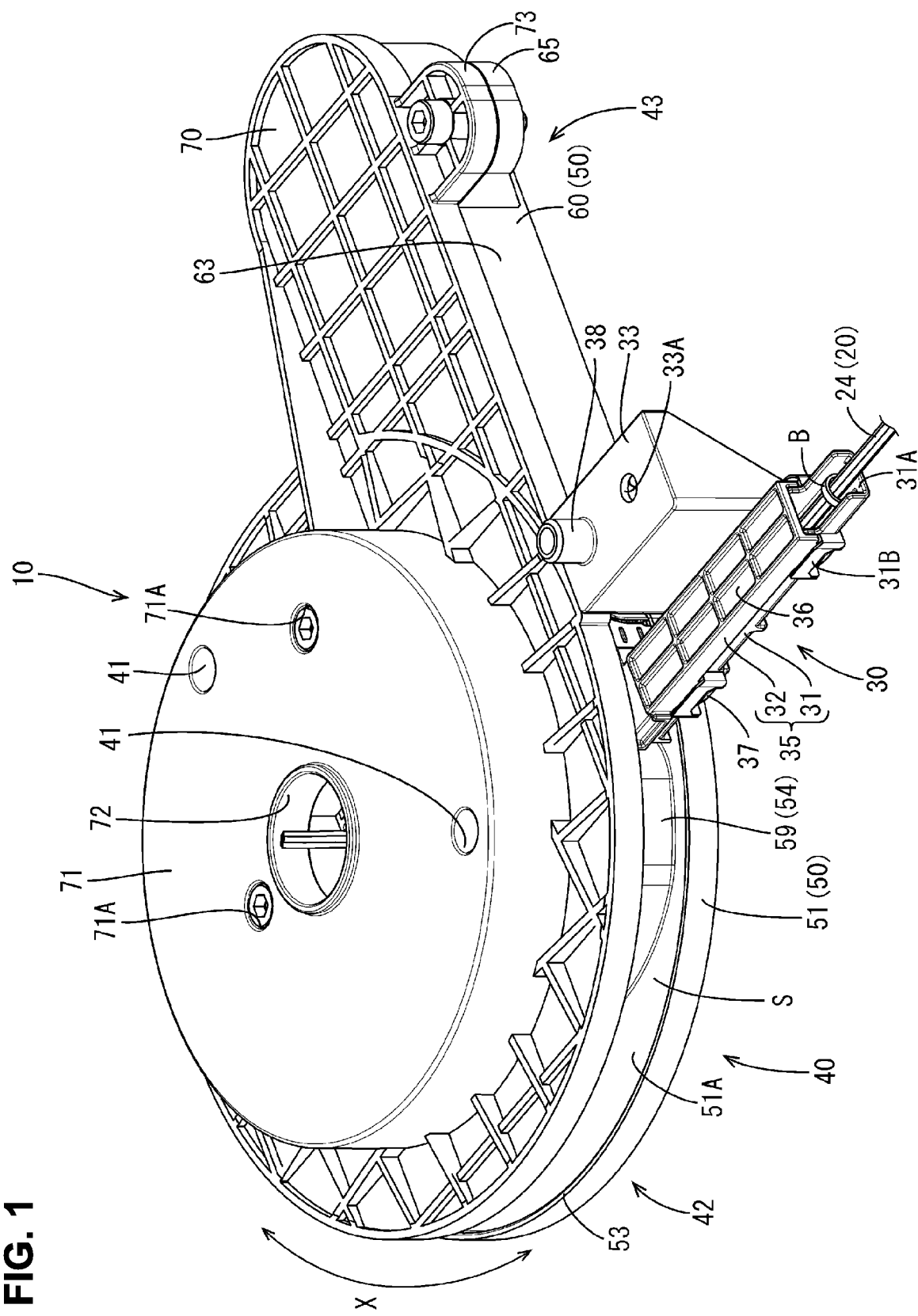
FIG. 1 is a perspective view of a wire harness routing apparatus in a second state.
Figure 2:
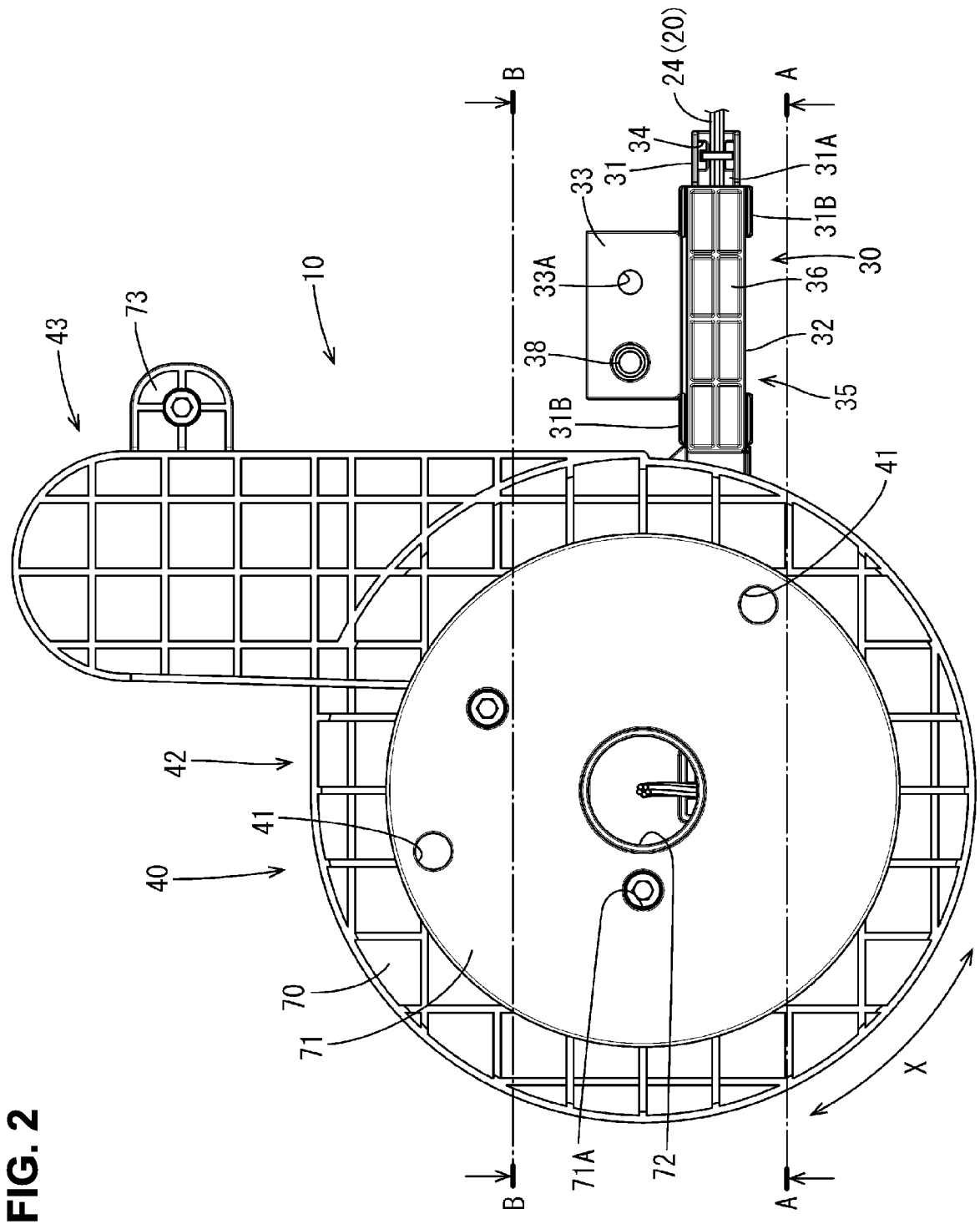
FIG. 2 is a plan view of the wire harness routing apparatus in the second state.
Figure 3:
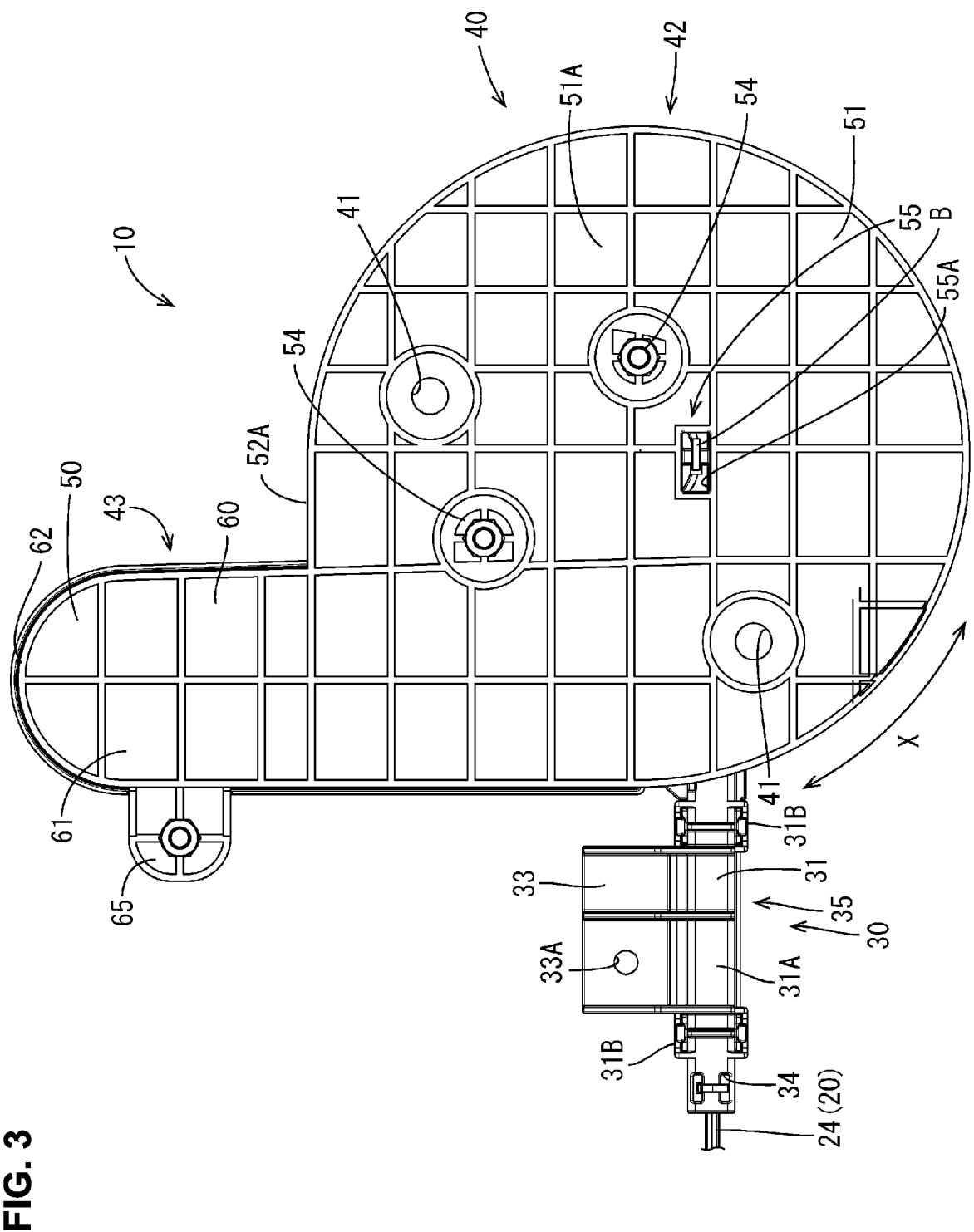
FIG. 3 is a bottom view of the wire harness routing apparatus in the second state.

As shown in FIGS. 1 and 2, the mounting portion 31 includes an approximately rectangular bottom plate 31A with an upper surface on which the multiple wires 24 can be mounted, and the multiple wires 24 are fixed to the mounting portion 31 by the base-side fixing portion 30 due to the multiple wires 24 being bundled together with the bottom plate 31A by passing a bundling band B through a pair of band holes 34 provided through the bottom plate 31A.

Figure 4:
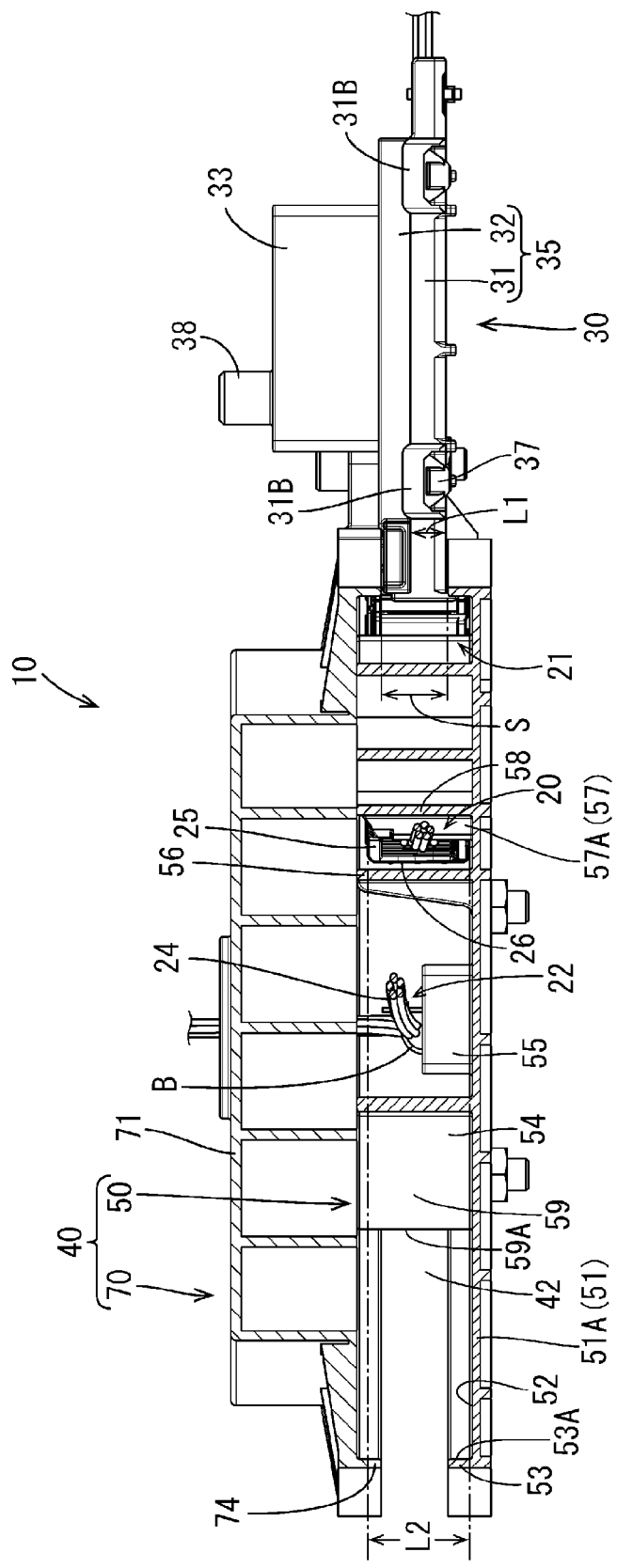
FIG. 4 is a cross-sectional view taken along line A-A of FIG. 2.

The lid portion 32 forms a fixing portion main body 35 together with the mounting portion 31 by being attached to the mounting portion 31, and includes an approximately rectangular lid main body 36 that covers the multiple wires 24 arranged in the mounting portion 31 from above, and multiple locking pieces 37 that can lock to multiple locked portions 31B provided on both side edges of the mounting portion 31. Due to each locking piece 37 and a corresponding locked portion 31B locking with each other in the up-down direction, the lid main body 36 is held in the mounting portion 31 in a state of covering the multiple wires 24 from above, thus forming the fixing portion main body 35, and a height L1 of the fixing portion main body 35 is set to be smaller than a height L2 of the outer covering body 25 as shown in FIG. 4.

As shown in FIGS. 1 to 5, the fixing piece 33 is in a form of extending in the horizontal direction after rising upward from one side edge of the mounting portion 31. A circular tube portion 38 that can fit in a plate thickness direction into the base main body 83 of the base portion 82, and a through hole 33A that is formed through the fixing piece 33 in the up-down direction are provided on the upper surface of the fixing piece 33. The circular tube portion 38 is fit into the base main body 83, the through hole 33A is aligned with a bolt hole 83B provided in the base main body 83, and the base-side fixing portion 30 is fixed to the base main body 83 of the base portion 82 through bolt fastening or the like. That is, the base-side end portion 21 of the wire harness 20 is fixed to the base portion 82 via the base-side fixing portion 30.

The case 40 is made of a synthetic resin, and as shown in FIG. 11, is arranged between the pair of leg portions 84 and the pair of rails 81 on the base portion 82. The case 40 is fixed to the seat-side pedestal 94 by inserting bolts (not shown) through the bolt insertion holes 41 formed through the case 40 in the up-down direction and fastening the bolts to the seat-side pedestal 94 of the rotation platform 90. Accordingly, as shown in FIGS. 10, 14, and 16, the case 40 can rotate in the same manner as the seat 80 in an approximately 270-degree range between the second state and the third state accompanying the rotation of the seat 80.

Also, as shown in FIGS. 1 to 5, the case 40 includes a lower case 50 on which the wire harness 20 is mounted, and an upper case 70 that is attached to the lower case 50 from above, and when the upper case 70 is attached to the lower case 50 from above, the wire harness 20 that is mounted on the lower case 50 is covered from above by the upper case 70.

The lower case 50 is constituted by including a circular portion 51 that is provided around the rotational shaft of the seat 80, and a bulging portion 60 that bulges from the circular portion 51.

The circular portion 51 includes a circular bottom plate portion 51A whose outer shape is approximately circular in a plan view, and a seat-side fixing portion 54 that is provided on the circular bottom plate portion 51A.

In the circular bottom plate portion 51A, an approximately 270-degree range is formed into a circular shape using the rotational center of the case 40 as a central point, and a linear portion 52A that extends in a tangent line direction from the circular portion is provided at one end portion of the circular bottom plate portion 51A.

A lower-side retaining portion 53 that is provided standing slightly upward is provided on the outer circumferential edge of the circular bottom plate portion 51A. The inner circumferential surface of the lower-side retaining portion 53 is a circular first inner circumferential surface 53A that is located on the outer side in the radial direction of the circular portion 51 and is arranged along the outer shape of the circular bottom plate portion 51A.

A portion of the outer shape of the circular bottom plate portion 51A is formed so as to conform to a circular arc-shaped rotational path X along which the base-side fixing portion 30 fixed on the base portion 82 moves relatively about the circular bottom plate portion 51A when the case 40 rotates in accordance with the rotation of the seat 80. For this reason, as shown in FIG. 20, the circular portion 51 is in a form of being arranged in the entire range of a rotational path X of the base-side fixing portion 30.

The seat-side fixing portion 54 that fixes the seat-side end portion 22 of the wire harness 20 is provided in the central portion of the circular bottom plate portion 51A.

Figure 8:
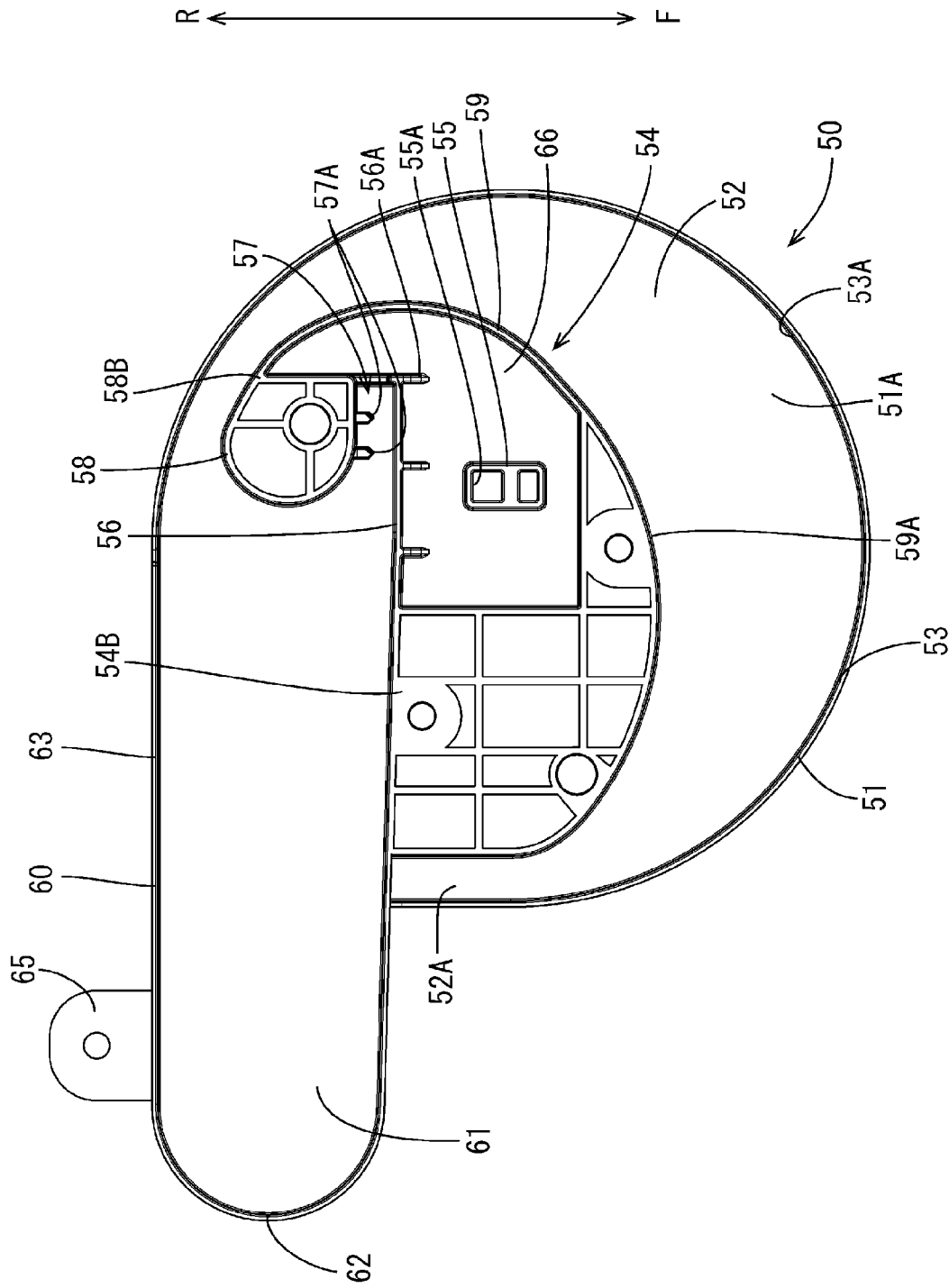
FIG. 8 is a cross-sectional view of the lower case.
Figure 9:
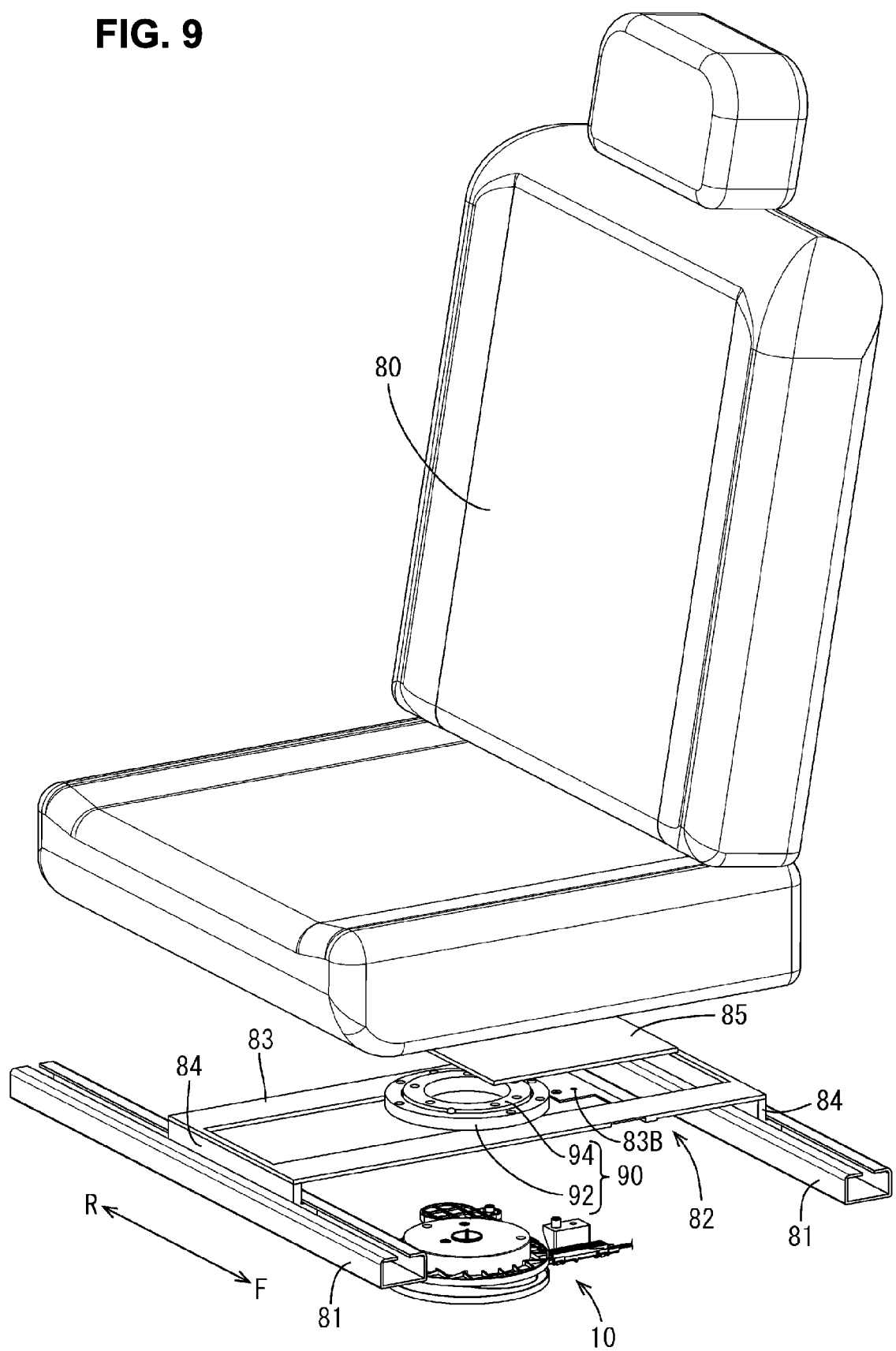
FIG. 9 is a perspective view showing a state prior to attaching the wire harness routing apparatus to a seat and a base portion.

In the first state shown in FIGS. 8 and 18, the seat-side fixing portion 54 is constituted by including a wire fixing portion 55 that is arranged at a position that is slightly rightward with respect to the rotational center position, an outer covering body fixing portion 57 that is arranged rearward, separated by a partition wall 56 that is provided rearward of the wire fixing portion 55, an overhang portion 58 that overhangs slightly obliquely rearward and to the left from the rear end portion of the outer covering body fixing portion 57, and an inner circumferential wall 59 that curves in a clockwise direction originating from the overhang portion 58.

The wire fixing portion 55 fixes the multiple wires 24 pulled out toward the seat 80 from the outer covering body 25 of the wire harness 20, and fixes the end portions on the seat 80 side of the multiple wires 24 due to a bundling band B being inserted through a pair of holes 55A that are formed in the up-down direction through the circular bottom plate portion 51A to bundle together the circular bottom plate portion 51A and the multiple wires 24.

As shown in FIG. 18, the end portions on the seat 80 side of the multiple wires 24 are fixed in the wire fixing portion 55, and thereafter, as shown in FIGS. 1, 2, and 4, the end portions of the multiple wires 24 are pulled out toward the seat 80 arranged thereabove, so as to extend along the rotational center of the case 40. In the first state shown in FIG. 18, the multiple wires 24 that extend from the wire fixing portion 55 toward the outer covering body 25 extend rightward from the wire fixing portion 55, then bypass the right side of the partition wall 56 by being folded back leftward, and thereafter are led into the outer covering body 25.

In the first state shown in FIGS. 8 and 18, the partition wall 56 is in a form of extending straight to the left from a position slightly to the right with respect to the outer covering body fixing portion 57 and extending to the outer circumferential edge of the circular bottom plate portion 51A, and the height of the partition wall 56 is set to be greater than the height of the lower-side retaining portion 53. Also, the outer covering body fixing portion 57 is provided on the rear surface of the right-side end portion of the partition wall 56.

In the first state shown in FIG. 18, the outer covering body fixing portion 57 includes a pair of ribs 57A that extend vertically and are provided protruding frontward from the front surface of the overhang portion 58 arranged rearward of the outer covering body fixing portion 57, and the end portion on the seat 80 side of the outer covering body 25 is fixed to the seat-side fixing portion 54 by gripping the end portion of the outer covering body 25 using the pair of ribs 57A and the partition wall 56.

As shown in FIG. 18, the overhang portion 58 has an approximately circular shape in a plan view, and the outer shape of the overhang portion 58 is formed such that its radius of curvature is greater than the allowable radius of curvature of the outer covering body 25.

In the first state shown in FIG. 18, the inner circumferential wall 59 is in a form of being continuous with the right-side end portion 58B of the overhang portion 58 and extending in the form of a circular arc to the left-side end portion 56A of the partition wall 56 such that the wire fixing portion 55 and the outer covering body fixing portion 57 are arranged inside of the inner circumferential wall 59. Also, the inner circumferential wall 59 is formed so as to oppose the first inner circumferential surface 53A in the radial direction such that the central portion of the inner circumferential wall 59 is the most spaced apart from the first inner circumferential surface 53A of the lower-side retaining portion 53, and the inner circumferential wall 59 is configured such that its radius of curvature is greater the more spaced apart it is from the overhang portion 58 and the outer covering body fixing portion 57.

That is, a space for accommodating the wires 24 pulled out from the outer covering body 25 is provided between the outer covering body fixing portion 57 and the wire fixing portion 55 inside of the inner circumferential wall 59, and this space is a wire excess length accommodation portion 66 that accommodates the excess length of the wires 24 pulled out from the end portion of the outer covering body 25 due to the difference in radius of curvature between the outer covering body 25 and the wires 24 when the wire harness 20 is bent.

Also, as shown in FIG. 18, the space between a second inner circumferential surface 59A of the lower-side retaining portion 53 and the first inner circumferential surface 53A of the lower-side retaining portion 53 in the inner circumferential wall 59 is a harness accommodation portion 52 in which the outer covering body 25 that is fixed to the outer covering body fixing portion 57 is arranged, and the harness accommodation portion 52 is arranged on the outer side in the radial direction with respect to the seat-side fixing portion 54 in the circular portion 51.

Then, upon entering the third state shown in FIG. 20, the case 40 enters a state in which, in the harness accommodation portion 52, the outer covering body 25 of the wire harness 20 is wrapped rightward so as to wrap around the overhang portion 58 and the second inner circumferential surface 59A, originating from the outer covering body fixing portion 57, and extends to the base-side fixing portion 30.

In the first state shown in FIG. 18, the bulging portion 60 is in a form extending linearly in a tangent line direction of the circular bottom plate portion 51A from a right rear end portion at which the overhang portion 58 of the circular portion 51 is arranged. That is, the bulging portion 60 is in a form bulging from the circular bottom plate portion 51A (the range of the path of the base-side fixing portion 30), and is provided at a position on the upper side, which is the side opposite to that of the harness accommodation portion 52 provided on the lower side, using the seat-side fixing portion 54 as a reference.

The bulging portion 60 includes a flat plate-shaped bulging bottom plate portion 61 that is continuous with the circular bottom plate portion 51A in the same plane, and the bulging end portion of the bulging bottom plate portion 61 is a rounded semicircular curved portion 62. The radius of curvature of the curved portion 62 is set to be greater than the allowable radius of curvature of the outer covering body 25 in the wire harness 20. A side wall portion 63 that is continuous with the left-side end portion 56A of the partition wall 56 of the circular portion 51 and the right rear end portion of the lower-side retaining portion 53 is formed at the same height as the partition wall 56 on the outer circumferential edge of the bulging bottom plate portion 61.

Accordingly, the range in which the base-side fixing portion 30 can relatively move over the outer circumference of the circular portion 51 is an approximately 270-degree range centered about the rotational center, from a left end portion (boundary portion between the circular portion 51 and the lower-side wall of the bulging portion 60) of the circular portion 51 at which the linear portion 52A of the circular bottom plate portion 51A is arranged, to the position of the rear end portion of the circular portion 51 at which the overhang portion 58 of the seat-side fixing portion 54 is arranged (rotating counterclockwise about the circular portion 51 from the third state shown in FIG. 20 to the second state shown in FIG. 19).

In the first state shown in FIG. 18, the outer covering body 25 of the wire harness 20 is arranged folded back in the left-right direction inside of the bulging portion 60. Specifically, the outer covering body 25 of the wire harness 20 extends along the partition wall 56 from the outer covering body fixing portion 57 to the left end portion of the partition wall 56, and thereafter is arranged along the lower-side retaining portion 53 of the circular portion 51 due to being folded back in the rightward direction toward the overhang portion 58, and the wire harness 20 is arranged spanning between the interior of the bulging portion 60 and the interior of the harness accommodation portion 52.

Also, when the case 40 is rotated clockwise from the first state to the second state as shown in FIG. 19, the outer covering body 25 of the wire harness 20 is arranged in the bulging portion 60 in a state of being folded back so as to fold the outer covering body 25 in half. Specifically, the outer covering body 25 of the wire harness 20 is arranged in the bulging portion 60 in a state of being arranged along the partition wall 56 and the side wall portion 63 of the bulging portion 60 from the outer covering body fixing portion 57, then being bent and folded over to the right at a curved portion 62, and being continuous with the base-side fixing portion 30 arranged rearward of the overhang portion 58.

Figure 6:
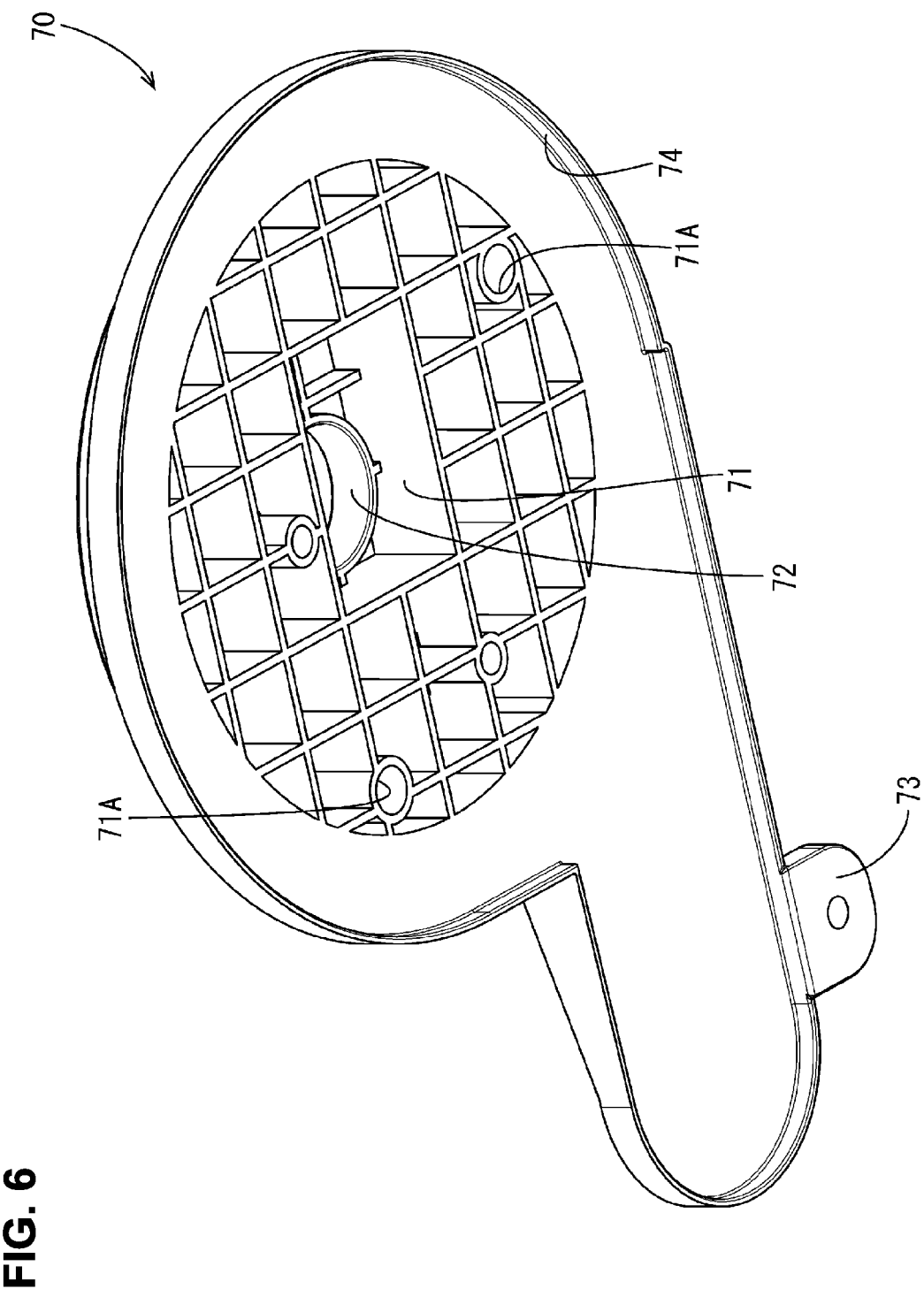
FIG. 6 is a perspective view showing a state in which an upper case is viewed obliquely from below.
Figure 7:
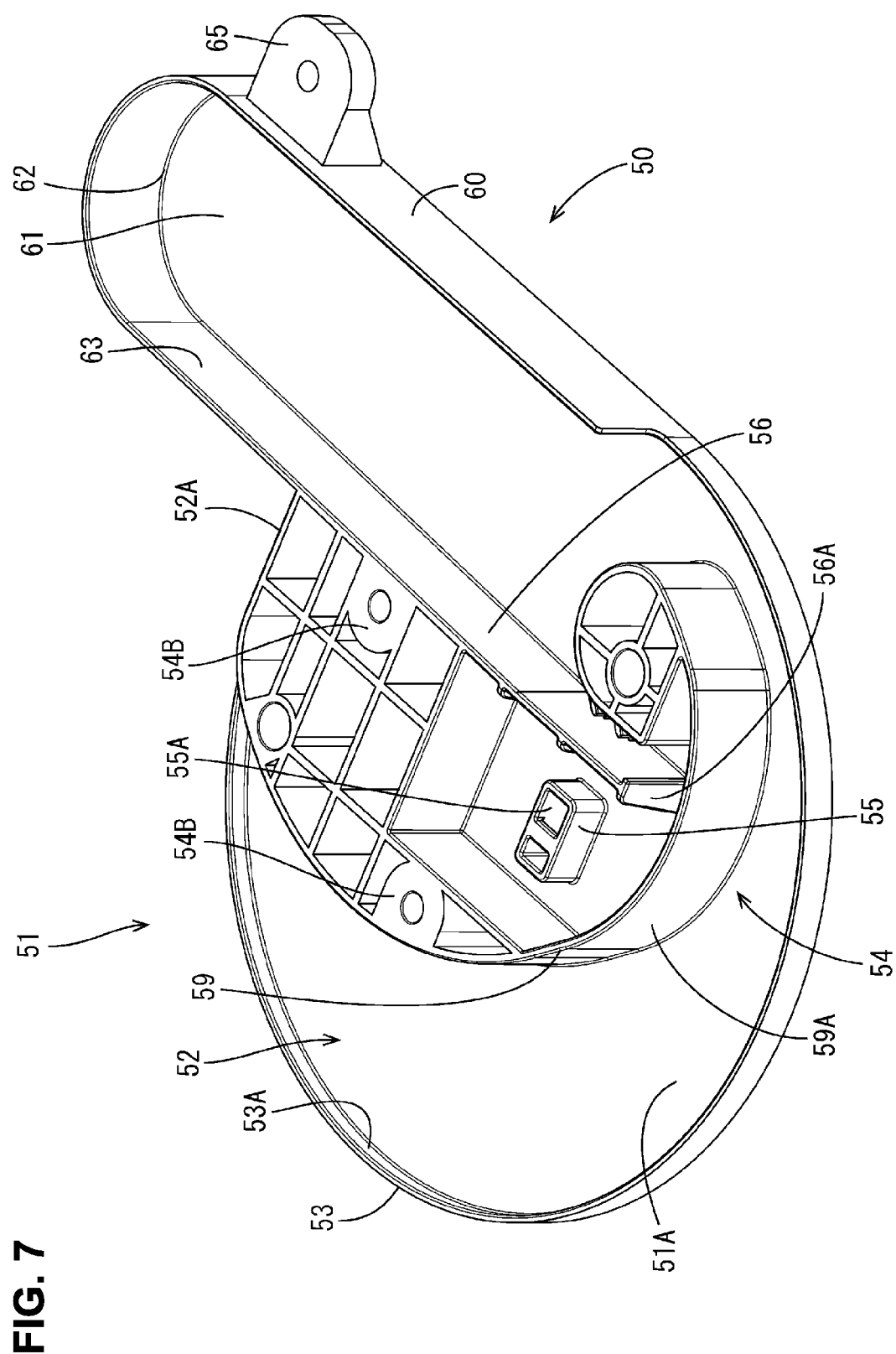
FIG. 7 is a perspective view showing a state in which a lower case is viewed obliquely from above.

Next, the upper case 70 will be described. As shown in FIGS. 1, 2, and 6, the upper case 70 has approximately the same shape as the outer shape of the lower case 50. A protruding circular portion 71 that protrudes upward in a circular shape is provided in the portion of the upper case 70 covering the circular portion 51 of the lower case 50 from above. A wire through hole 72 through which the multiple wires 24 pulled out upward from the wire fixing portion 55 of the lower case 50 are inserted is provided in the center of the protruding circular portion 71, and a pair of screw holes 71A are provided in the surrounding area of the wire through hole 72.

The pair of screw holes 71A are provided at positions corresponding to a pair of fastening portions 54B that are formed in the seat-side fixing portions 54 of the lower case 50, the screw holes 71A and the fastening portions 54B are overlapped with each other, an upper-side bracket 73 provided on the upper case 70 and a lower-side bracket 65 provided on the bulging portion 60 of the lower case 50 are overlapped with each other, and by screwing them together, the lower case 50 and the upper case 70 are integrally attached to each other to form the case 40.

Then, when the case 40 is formed, the first accommodation portion 42 is formed by the circular portion 51 of the lower case 50 and the upper case 70, and the second accommodation portion 43 is formed by the bulging portion 60 of the lower case 50 and the upper case 70.

Also, as shown in FIG. 6, the lower-side retaining portion 53 on the circular portion 51 of the lower case 50 and the upper-side retaining portion 74 that opposes the side wall portion 63 on the bulging portion 60 in the up-down direction are formed on the outer circumferential edge of the upper case 70. As shown in FIG. 4, the upper-side retaining portion 74 is provided at approximately the same height as the lower-side retaining portion 53, and when the lower case 50 and the upper case 70 are integrally attached to each other to form the case 40, a gap S is provided between the lower-side retaining portion 53 and the upper-side retaining portion 74.

As shown in FIG. 4, although the fixing portion main body 35 on the base-side fixing portion 30 of the wire harness 20 can be arranged in a state of having clearance in the gap S, the outer covering body 25 is set to a dimension at which it cannot be inserted through the gap S. Accordingly, in a state in which the outer covering body 25 of the wire harness 20 is accommodated in the case 40, the outer covering body 25 is retained from the gap S of the case 40 by the lower-side retaining portion 53 and the upper-side retaining portion 74, but the case 40 can rotate in a state in which the base-side fixing portion 30 is exposed from the case 40.

The configuration of the present embodiment is as described above. Next, operations and effects of the wire harness routing apparatus 10 will be described.

For example, if the rotation angle of the rotatable seat is small, such as a rotation angle that is less than 180 degrees, the excess length of the wire harness that occurs during rotation also shortens, and therefore the excess length of the wire harness can be absorbed in the case. However, if the rotation angle of the seat is increased, for example, if the rotation angle of the seat is made greater than 180 degrees, the excess length of the wire harness that occurs during rotation will increase, and therefore there is concern that the excess length of the wire harness cannot be absorbed in the case. Even so, if the size of the case is increased, there is concern that when the case is rotated according to the rotation of the seat, the case will interfere with other members or the like.

However, according to the present embodiment, the case 40 is provided with a circular portion 51 that is arranged in the entire range of the rotational path X so as to conform to the rotational path X on which the base-side fixing portion 30 rotates relative to the case 40, and a bulging portion 60 that bulges so as to conform to a tangent line of the circular portion 51 from a portion different from the range of the rotational path X on which the base-side fixing portion 30 rotates in the circular portion 51.

That is, the excess length of the wire harness 20 can be accommodated in the circular portion 51 and the wire harness 20 can be accommodated in the bulging portion 60 provided bulging from the circular portion 51 as well.

That is, even if the rotational angle of the seat 80 is large, such as a rotational angle of 180 degrees or more, the excess length of the wire harness 20 can be absorbed. Also, the circular portion 51 is provided inside of the range of the rotational path X on which the base-side fixing portion 30 rotates, and the bulging portion 60 is provided bulging outward from a portion that is different from the range of the rotational path X on which the base-side fixing portion 30 rotates, and therefore the excess length of the wire harness 20 can be absorbed by the circular portion 51 and the bulging portion 60 without hindering the rotation of the seat 80.

Also, the circular portion 51 is provided on the entire inner side of the rotational path X of the base-side fixing portion 30 so as to conform to the rotational path X, and therefore, for example, compared to the case of providing a rectangular or small circular accommodation portion in the rotational center, it is possible to allow the wire harness 20 to move in a state of being loosely bent in the circular portion 51. Accordingly, the movement of the wire harness 20 in the circular portion 51 is smooth, and it is possible to suppress hindrance of the rotation of the seat 80 caused by the movement of the wire harness 20.

Also, since the bulging portion 60 is in a form that bulges so as to conform to a tangent line of the circular portion 51, for example, compared to the case of providing the bulging portion protruding in the radial direction with respect to the circular portion, it is possible to smoothly route the wire harness 20 arranged spanning between the circular portion 51 and the bulging portion 60 without excessively bending it.

Here, for example, if the allowable radius of curvature of the wire harness is large, the circular portion and, consequently, the entire case tend to increase in size. However, according to the present embodiment, it is possible to suppress an increase in the size of the circular portion 51 while absorbing the excess length of the wire harness 20.

Also, according to the present embodiment, the bulging portion 60 is provided at a position on the side opposite to that of the harness accommodation portion 52 using the seat-side fixing portion 54 as a reference, and the curved portion 62, which has a radius of curvature that is greater than the allowable radius of curvature of the wire harness 20, is provided at the bulging end portion of the bulging portion 60.

Here, for example, if the bulging portion is arranged at a position on the same side as the harness accommodation portion using the seat-side fixing portion as a reference, there is concern that when the case is rotated, the wire harness will bend excessively and be damaged.

However, according to the present embodiment, if the case 40 is put in the second state shown in FIG. 19, the excess length of the wire harness 20 can be accommodated by loosely bending in the bulging portion 60. Also, if the case 40 is put in the third state shown in FIG. 20, the excess length of the wire harness 20 can be accommodated by conforming to the second inner circumferential surface 59A in the harness accommodation portion 52, and therefore it is possible to prevent the wire harness 20 from excessively bending, and it is possible to cause the wire harness 20 to move smoothly in the bulging portion 60.

Accordingly, it is possible to suppress hindrance of the rotation of the seat 80 and damage to the wire harness 20 caused by the wire harness 20 excessively bending or the wire harness 20 moving in the case 40.

Also, according to the present embodiment, the second inner circumferential surface 59A of the inner circumferential wall 59 opposes the first inner circumferential surface 53A in the radial direction such that its central portion is the most spaced apart from the first inner circumferential surface 53A of the lower-side retaining portion 53, and is formed such that its radius of curvature increases the more spaced apart it is from the bulging portion 58 and the outer covering body fixing portion 57.

Here, for example, if the wire harness accommodated in the harness accommodation portion of the circular portion in the third state shown in FIG. 20 is long, the bulging portion will need to be increased in size in order to accommodate the excess length of the wire harness 20 when the case 40 is rotated leftward to be arranged in the second state.

However, according to the present embodiment, when the case 40 is rotated to the third state shown in FIG. 20 such that the wire harness 20 is wrapped around the seat-side fixing portion 54, the wire harness 20 is arranged along the second inner circumferential surface 59A, and therefore, for example, compared to the case of arranging the wire harness along the first inner circumferential surface, it is possible to reduce the length dimension of the wire harness 20 that is accommodated in the circular portion 51. That is, by shortening the excess length of the wire harness 20 that is accommodated in the harness accommodation portion 52 of the circular portion 51, the space for accommodating the excess length of the wire harness 20 in the bulging portion 60 can be made smaller, and it is possible to suppress an increase in the size of the bulging portion 60.

Also, according to the present embodiment, the radius of curvature of the second inner circumferential surface 59A of the inner circumferential wall 59 increases the more spaced apart the second inner circumferential surface 59A is from the position at which the wire harness 20 is fixed. That is, since the radius of curvature is the greatest at the portion that is the most spaced apart from the position at which the wire harness 20 is fixed, when the case 40 is rotated counterclockwise to the first state after the third state in which the wire harness 20 is arranged along the second inner circumferential surface 59A of the seat-side fixing portion 54, it is possible to rotate the case 40 such that the second inner circumferential surface 59A presses the wire harness 20. Accordingly, the wire harness 20 can be moved smoothly from the harness accommodation portion 52 of the circular portion 51 to the bulging portion 60.

In view of this, in the case of the wire harness 20 in which the multiple wires 24 are inserted through the outer covering body 25 as in the present embodiment, when the wire harness 20 is bent, the wires 24 are pulled out from the end portion of the outer covering body 25 in some cases due to the difference in radius of curvature between the outer covering body 25 and the wires 24.

However, with the present embodiment, the wire excess length absorption portion 66 is provided between the outer covering body fixing portion 57 and the wire fixing portion 55 inside of the inner circumferential wall 59 in the seat-side fixing portion 54, and the excess length of the wires 24 pulled out from the outer covering body 25 can be absorbed when the wire harness 20 is bent, and therefore, it is possible to suppress hindrance of the rotation of the seat 80 caused by the excess length of the wires 24 pulled out from the outer covering body 25 when the wire harness 20 was bent.

Other Embodiments

The technique disclosed in the present specification is not limited to the embodiment described using the above description and the drawings, and for example, encompasses the following various modes.

(1) In the above-described embodiment, a configuration was used in which the bulging portion 60 is formed so as to conform to a tangent line of the circular portion 51 and the case 40 rotates 270 degrees. However, there is no limitation to this, and it is also possible to use a configuration in which the bulging portion is formed so as to protrude in the radial direction from the circular portion and the case rotates 270 degrees or more.

(2) In the above-described embodiment, a configuration was used in which the circular portion 51 forming the first accommodation portion 42 together with the upper case 70 is arranged on the entire inner side of the range of the rotational path X on which the base-side fixing portion 30 moves. However, there is no limitation to this, and as long as the circular portion is arranged inside of the range of the path on which the base-side fixing portion moves, the circular portion need not be arranged on the entire inner side of the range of the path on which the base-side fixing portion moves, and the portion that forms the first accommodation portion together with the upper case may also be formed into a polygonal shape.

(3) In the above-described embodiment, the bulging portion 60 was constituted in a form extending linearly from the end portion of the circular portion 51. However, there is no limitation to this, and the bulging portion may also be formed rounded at the end portion of the circular portion, or formed in a polygonal shape.

(4) In the above-described embodiment, a configuration was used in which the central portion of the inner circumferential wall 59 of the seat-side fixing portion 54 is the most spaced apart from the first inner circumferential surface 53A of the lower-side retaining portion 53. However, there is no limitation to this, and the inner circumferential wall may also be formed such that the distance between the inner circumferential wall and the first inner circumferential wall of the lower-side retaining portion is constant.

(5) In the above-described embodiment, a configuration was used in which the outer covering body 25 of the wire harness 20 bends rightward, which is clockwise. However, there is no limitation to this, and it is also possible to use a configuration in which the outer covering body is formed into a shape in which the first accommodation portion and the second accommodation portion are inverted and the outer covering body bends leftward, which is counterclockwise.

LIST OF REFERENCE NUMERALS

10 Wire harness routing apparatus
20 Wire harness
24 Wire
25 Outer covering body
30 Base-side fixing portion
40 Case
42 First accommodation portion 43 Second accommodation portion
51 Circular portion
52 Harness accommodation portion
53A First inner circumferential surface
54 Seat-side fixing portion
55 Wire fixing portion
57 Outer covering body fixing portion
59A Second inner circumferential surface
62 Curved portion
66 Wire excess length absorption portion
80 Seat
82 Base portion

The invention claimed is:

1. A wire harness routing apparatus comprising:
a wire harness arranged between a base portion provided in a vehicle and a seat configured to be able to rotate with respect to the base portion;
a case configured to rotate together with the seat while accommodating the wire harness; and
a base-side fixing portion that fixes, to the base portion, an end portion of the wire harness pulled out toward the base portion from the case, and is configured to rotate relative to the case accompanying rotation of the seat,
wherein the case includes a first accommodation portion that is provided about a rotational axis of the seat and is arranged on an inner side of a range of a path on which the base-side fixing portion rotates relative to the case, and
a second accommodation portion that is provided bulging outward from a portion that is different from the range of the path on which the base-side fixing portion rotates in the first accommodation portion.

2. The wire harness routing apparatus according to claim 1, wherein the first accommodation portion includes a circular portion that is formed into an approximately circular shape such that a portion of an outer shape of the first accommodation portion conforms to a rotational path of the base-side fixing portion.

3. The wire harness routing apparatus according to claim 2, wherein the second accommodation portion is formed continuously with an end portion of the circular portion so as to conform to a tangent line of the circular portion.

4. The wire harness routing apparatus according to claim 3, wherein
the second accommodation portion includes, in a bulging end portion, a curved portion along which the wire harness is arranged in a bent condition, and
the radius of curvature of the curved portion is set to be greater than an allowable radius of curvature of the wire harness.

5. The wire harness routing apparatus according to claim 2, wherein
a seat-side fixing portion for fixing an end portion on the seat side of the wire harness toward the rotational center of the case, and a harness accommodation portion arranged outward in a radial direction with respect to the seat-side fixing portion are provided in the circular portion,
the wire harness is accommodated in the harness accommodation portion when the case is rotated in one direction, and the wire harness is accommodated in the second accommodation portion when the case is rotated in another direction, which is a direction opposite to the one direction, and
the second accommodation portion is provided at a position on a side opposite to that of the harness accommodation portion, using the seat-side fixing portion as a reference.

6. The wire harness routing apparatus according to claim 5, wherein
the harness accommodation portion includes a first inner circumferential surface that is located on an outer side in a radial direction and is provided in a circular arc shape, and a second inner circumferential surface that is formed curved on the seat-side fixing portion side so as to oppose the first inner circumferential surface, and
the harness accommodation portion is formed such that a distance between a central portion of the second inner circumferential surface and the first inner circumferential surface is the greatest.

7. The wire harness routing apparatus according to claim 6, wherein the second inner circumferential surface is formed such that its radius of curvature increases the more spaced apart the second inner circumferential surface is from the position at which the wire harness is fixed in the seat-side fixing portion.

8. The wire harness routing apparatus according to claim 5, wherein the wire harness includes an outer covering body that is configured to bend only in one direction, and a wire that is inserted through the outer covering body and is configured to move together with the outer covering body in the case.

9. The wire harness routing apparatus according to claim 8, wherein
the seat-side fixing portion includes an outer covering body fixing portion for fixing the outer covering body, and a wire fixing portion for fixing the wire pulled out from the outer covering body, and
a wire excess length absorption portion for accommodating the wire pulled out from the outer covering body when the wire harness moves in the case is provided between the outer covering body fixing portion and the wire fixing portion in the seat-side fixing portion.

* * * * *